United States Patent

[11] 3,632,889

[72] Inventors Michael Frank Sikorsky
Neptune City;
Herman Ewald Voigt, Middletown, both of N.J.

[21] Appl. No. 2,580
[22] Filed Jan. 13, 1970
[45] Patented Jan. 4, 1972

[73] Assignee Bell Telephone Laboratories Incorporated
Murray Hill, N.J.

[54] INFORMATION FILTER AND STEERING CIRCUIT
46 Claims, 19 Drawing Figs.

[52] U.S. Cl. .......... 179/27 FF, 444/1
[51] Int. Cl. .......... H04m 3/60
[50] Field of Search .......... 179/18 ES, 27 FF

*Primary Examiner*—William C. Cooper
*Attorneys*—R. J. Guenther and James Warren Falk

ABSTRACT: A program arrangement for a telephone system is disclosed in which operator position key action signals are rehoppered for a call whenever the signals are received by the base level processor during short real time breaks of a priorly initiated base level key action program that has not yet completed its work function for the same call. When the program takes a real time break of a significantly longer duration, such as queuing for an available facility, the rehoppered key signals and any newly arrived key signals for the same call are analyzed to determine whether they represent logical or illogical service requests. Illogical requests are disregarded. Logical requests are used to change the state or progress of the call.

INVENTORS
M. F. SIKORSKY
H. E. VOIGT
BY Donald M Duft
ATTORNEY

ACTION MAKING USE OF PRB AS BLOCKING MECHANISM

USE OF KST WHEN THE ACTION INITIATED IS COMPLETED BY SOME OTHER SYSTEM PROGRAM OVER RELATIVELY LONG PERIOD OF TIME

INFORMATION FILTER AND STEERING CIRCUIT

INTRODUCTION

This invention relates to a telephone switching system, and in particular to a telephone switching system of the stored program controlled type. The invention further relates to a stored program controlled switching system in which the system processor performs its call serving functions in response to internally generated systems signals, customer generated supervisory signals, and operator generated key action signals. The invention still further relates to a program controlled telephone system equipped with facilities for receiving and processing the operator generated key action signals in an ordered manner that requires a minimum real time effort on the part of the system processor.

BACKGROUND OF THE INVENTION

Automatic telephone switching systems perform their call serving function in response to internally generated signals as well as in response to externally generated signals, such as for example, dial signals and supervisory signals. Signals may also be received from operator positions if a call requires operator assistance. U.S. Pat. No. 3,341,622 of Sept. 12, 1967 to L. J. Cerny et al. discloses a telephone switching system equipped with operator positions for providing the services required on customer dialed toll calls of the person-to-person, collect, credit card, coin and other similar types. Each call placed through the Cerny et al. system is jointly controlled by signals received from the calling station, from signals generated internally within the system, and from signals received from the operator positions which are equipped with keys for supplying vast and various quantities of call information.

It is, of course, necessary that the signals from these various sources be received in an ordered manner by the controlling mechanism of the Cerny system. The quantity and variety of signals that may be generated by the subscribers are limited and present no problem. The same is true of the system generated signals. However, the operator positions have many keys which permit the operators to provide service on many different types of calls. It is necessary that an operator depress the various keys at the right time and in the right sequence on each call if the information represented by the key depression is to be meaningful.

The Cerny et al. system is not immune to erroneous operator key depressions. However, its wired logic insures that erroneous key depressions will, at worse, only affect the call to which the key depression relates; conversely, they will not degrade the service on other calls currently being served by the system.

The copending allowed application Ser. No. 519,787, filed Jan. 10, 1966 to R. J. Jaeger and A. E. Joel, Jr., now U.S. Pat. No. 3,484,560, discloses an electronic type system for serving essentially the same types of calls as does the Cerny et al. Although the Cerny et al., and Jaeger et al., systems serve the same types of calls, the two systems differ in several important respects. First of all, the Jaeger et al. system is electronic and of the stored program type whereas Cerny et al., is of the electromechanical type. Secondly, the Cerny et al., equipment is an integral part of the switching center at which it is situated whereas the Jaeger et al., equipment is a physically independent system, it does not comprise a portion of any switching center or office. The Jaeger-Joel equipment is typically situated intermediate a local and a toll office and it is referred to as a Traffic Service Position System (TSPS) since it is independent both geographically and equipmentwise of any existing office, and since its sole function is to provide call service, including operator assistance, on many types of calls incoming to the tool office from the local office.

Each call extended via TSPS to a toll office is monitored, timed, and if desired pertinent charge data therefor recorded on the call termination. If the call requires operator assistance, a connection within the TSPS center to an operator is established at the same time the forward connection is set up to the toll office. Once connected, the operator performs the call duties required of her and then depresses keys at her position to indicate the type of service provided and to release her position from the call. This leaves the calling and called stations connected speechwise for the call duration.

In operator assistance type systems, such as Cerny and Jaeger, difficulties involving varying degrees of complexity and degradation of service may occur as a result of operator keying errors caused by either the depression of an otherwise correct key at the wrong time or in the wrong sequence, or by the depression of an incorrect key at anytime. The extent to which all service is degraded depends upon many parameters including the nature of the keying error and the state of the system at the time the error occurred. At one extreme, a keying error can be of only trivial significance and will merely cause a lamp at the operator position to flash. The operator may then correct the error by depressing the correct key. An error of this type will result in no impairment of service even for the call on which the error occurred. At the other extreme, a keying error may cause a release of the connection.

Although keying errors are undesirable both from the viewpoint of the customer and the telephone company, it is not realistic to expect that such errors can be totally eliminated; at best, they can be minimized. An important consideration is to design a system so that the adverse results of the keying errors will be minimal. Although a keying error may degrade or even disrupt service on the call for which the error occurred, it is of crucial importance to insure that a keying error on one call does not adversely affect the system's capability of serving other calls. In other words, the adverse effect of a keying error should be limited to the call for which the error occurred. The Cerny et al. system includes wired logic and control circuitry which inherently prevents a keying error on one call from effecting other calls.

The Jaeger et al. system is of the stored program controlled type, it contains only a minimum of wired logic, and the system's response to all signals it receives, including those representing operator key depressions, is determined solely by the stored program. A stored program system must respond to each and every signal; and the reception of each signal requires a finite amount of system time to determine the nature of the signal and what the system response to it should be. To put it another way, each reception of a signal consumes a finite amount of system real time. Real time is a precious commodity in stored program systems and it is highly important that the work that must be performed by a system does not exceed its real time capabilities. A strenuous effort is made by system designers and programmers to insure that this condition is met, since it represents a calamity, rather than an inconvenience, if a system runs out of real time.

It is therefore important that the Jaeger et al. system protect itself against operator keying errors in an efficient manner. It obviously would be wasteful of real time for a keying error to activate call processing programs so that one or ore useless circuit interconnections would be made before the system determined that the signal that initiated these actions represents an operator error. It is most desirable that the system should detect a keying error not only before it initiates erroneous circuit actions, but also, before it activates time consuming programming actions preparatory to or associated with the circuit operations. The errors must be detected efficiently since a failure to do so would be wasteful of real time. If errors occurred at a sufficiently rapid rate, and if they were not efficiently detected, it is conceivable that they could consume enough real time that the system's ability to serve other calls would be degraded.

The foregoing comments regarding keying errors are also applicable to busy periods during which the operator may generate key signals at an excessive rate. Generally speaking, an electronic type system can only perform one function at a time for each call it serves. Therefore, it is necessary during periods of high operator keying rates, that the system does not waste its real time by responding to each and every key signal only to determine that the service requested by the signal cannot currently be honored because priorly requested work for the same call has not yet been completed. It is mandatory that the system efficiently determine that it cannot respond to further key signals on those calls for which it is currently performing priorly requested work tasks. A failure to dispose of or detect efficiently such key signals will degrade the system's capability serving all calls.

It may therefore be seen that the expedients used in the prior art switching systems to detect operator keying errors are not adequate in the present day stored program controlled electronic type systems.

It is an object of the invention to provide facilities for efficiently detecting erroneously generated call signals.

It is a further object to provide facilities in a stored program controlled system that permits call signals that represent illogical service requests to be detected with a minimum real time effort on the part of the system processor.

It is a further object to provide facilities in a stored program controlled system that permits signals representing operator keying errors to be detected in a minimum amount of system real time.

It is a further object to provide facilities for minimizing the real time that must be expended in responding to operator key signals that are generated at an excessive rate while the system has not yet completed a work task associated with a priorly received key signal for the same call.

SUMMARY OF THE INVENTION

In accordance with the disclosed illustrative embodiment of our invention, we provide an information filter and steering arrangement which (1) permits call signals that represent illogical service requests to be detected efficiently with a minimum expenditure of real time and (2) prevents any newly received call signal from initiating the performance of a task when the processor has not yet completed a task for a priorly received call signal.

Our information filter and steering arrangement has a first stage which includes a filter or gate unique to each operator position. This is termed a Position Register Busy (PRB) filter. It is normally in an open state in which information can pass through it. It is switched to a closed state whenever a base level program is called into action by a key action signal received from the operator position associated with the filter, provided that the work to be performed by the program can be completed without what is termed a long or longer real time break. The filter remains closed during what is termed a short real time break of the program and it does not open until the program completes its work or until it takes a longer real time break of possible indefinite duration. The meaning of the term "short real time break" and "long or longer real time break" is subsequently described in detail.

Each PRB filter may be considered as a gate or steering arrangement since whenever a particular filter is closed, all operator key signals received from its position are temporarily steered to and stored in area of memory termed a key scan rebuffer hopper. In a processor controlled type system as disclosed by Jaeger et al., the received key signals are detected by a scanner and are stored initially in an area of memory termed a key scan hopper. This hopper is periodically unloaded one signal at a time with each signal attempting to initiate the call serving action or work task it represents. In accordance with our invention each PRB filter is effectively interposed between the key scan hopper and the rest of the system so that a key action signal received from a position associated with a closed filter proceeds no further into the system and is transferred to and temporarily stored in a key scan rebuffer hopper.

A PRB filter opens whenever a base level key action program for the call currently served by its position is completed or when the active base level program for the call takes a real time break of an indefinite duration i.e., a long real time break. A break of this type may be of several seconds or possibly even of several minutes duration. The key action signals cannot be rehoppered for such a duration; the PRB filter is opened at such times; the key signals in the key scan rebuffer hopper are unloaded periodically, passed through the opened filter, and applied to the next stage of filtering that is provided in accordance with our invention. This next stage is referred to as a kil state (KST) filter system and it may assume any one of a plurality of numerical values each of which represents a unique state of the call being served by the position associated with the KST filter. There is a KST filter system unique to each PRB filter and, in turn, to each operator position. The KST filter effectively analyzes the service requested by each newly received key signal that passes through the PRB filter, and it determines whether the request is illogical and should therefore be disregarded, or alternatively whether it may be accepted and used to change the state or progress of the call.

The PRB and KST filters together protect the system against key signals that are generated at an excessive rate as well as against key signals that represent illogical service requests. The PRB filter by itself prevents any key signal from being honored during short real time breaks of a base level program currently attempting to complete a work task for a priorly received key signal from the same position. All key signals that are received during such periods are precluded from initiating call programming requests and are loaded temporarily into the key scan rebuffer hopper from the key scan hopper. A PRB filter is never permitted to remain closed for more than a few hundred milliseconds since the multiple processing of rehoppered key signals during the long intervals would consume real time and serve no useful purpose. A PRB filter is opened when a program for a signal that passed through the filter completes its call function or whenever the program takes a break of a significantly longer real time duration. An example of such a break would be when the position is placed on queue for a connection to another facility such as an outgoing trunk. During such breaks, which may last for several seconds or minutes, the signals may be unloaded from the rebuffer hopper and as each signal is unloaded, it passes through its PRB filter and is applied to its KST filter and analyzed to determine whether the signal represents an illogical request or information useful to the serving of the call. The signal is disregarded if it represents illogical information and is honored if it represents useful information.

Each KST filter is normally set to a "0" state and the PRB filter for a position normally opens after the processor completes a work task requested by a priorly received key signal. At such times any new key signal that is unloaded from the key scan rebuffer hopper or the key scan hopper will pass through the PRB filter and the "0" state of the KST filter to initiate the program action associated with the depressed key.

The combination of the PRB and the KST filters together with the rehoppering of the key signals during the closed state of the PRB filter provides an effective mechanism by means of which key signals may be prevented from wasting processor real time. This is achieved by preventing such signals from activating needless programming actions whenever the system is already attempting to perform a work task for a priorly received key signal.

Further in accordance with our invention, signals are received by a system report hopper from other portions of the system and are processed by a PRB and a KST filter in the same manner as are the operator key action signals. Each call extended to a position is uniquely associated with a pair of PRB filters. One PRB filter of the pair processes the operator key action signals as already described. The other PRB filter of the pair processes other types of call signals or reports. If a system signal or report is received, via the system report hopper, when the PRB filters for the call are closed, the report is temporarily stored in a system report rebuffer hopper. This hopper is analogous to the key scan rebuffer hopper in that it temporarily stores the reports received during the short real time breaks for which the PRB filter for the call are closed.

The report rebuffer hopper is unloaded periodically one signal at a time with each signal being applied to the PRB filter for its call or position. If the filter is still closed, the signal is again rehoppered. If its PRB filters are open, the unloaded report passes through one of its PRB filters and is applied to the KST filter system for the position to which the call pertaining to the report has be extended. The KST filter system effectively analyzes the report and determines what the system's response to it should be in the same manner as described for the key action signals.

The system report rebuffer hopper is unloaded as a matter of first priority ahead of the key scan rebuffer hopper. The reason for this is that system reports usually represents vitally needed information such as, for example, an indication that the calling customer has gone on-hook and has abandoned the call. The key scan rebuffer and key scan hoppers are unloaded as soon as the unloading of the system report information has been finished. The key scan rebuffer hopper is unloaded one signal at a time, with each signal being either rehoppered or analyzed by the KST filters as already described. Subsequently, when the unloading of the rebuffer hopper is completed, the key scan hopper itself may be unloaded and each signal in it is either entered in the key scan rebuffer hopper or is applied to the KST filter for analysis in the same manner as are the signals from the key scan rebuffer hopper. Thus, the priority structuring between the hoppers is such that the system report rebuffer hopper is unloaded first followed by the key scan rebuffer hopper and then the key scan hopper.

The system report hopper is unloaded independently of the other three hoppers, but reports received from this hopper are also subject to both PRB and KST filtering. The reason that this hopper can be served independently is that the order of receiving system reports is of no concern. However, the system report rebuffer hopper is included in the priority arrangement because once it is determined that a system report has been received that could not be acted on immediately, it must be given priority over key signals from the position.

A feature of our invention is the provision of facilities which (1) temporarily store signals received for a call during short real time breaks of a priorly initiated base level program for the same call and (2) subsequently analyze each stored signal during a long real time program break to determine whether each signal represents a logical or illogical service request.

A further feature is the provision of facilities for disregarding a signal if it represents an illogical request and for changing the state of the call if the signals represent a logical service request.

A further feature is the provision of facilities for receiving key action signals and report signals from separate sources, temporarily storing the key action and report signals in separate hopper facilities during short real time program breaks and, upon a longer real time program break, analyzing first the stored report signals and then analyzing the stored key action signals.

A further feature is the provision of facilities for receiving call signals in a first hopper, periodically unloading the hopper, utilizing the signals immediately whenever the system is not under control of a program to which the signal pertains, transferring each unloaded signal to a rebuffer hopper during short real time program breaks for a call to which the signal pertains, periodically unloading the rebuffer hopper, reentering into the rebuffer hopper each signal that is unloaded therefrom during a short real time program break of a call to which the signal pertains, analyzing each signal that is unloaded from either hopper during a longer real time program break, disregarding a signal if it represents an illogical service request and changing the call state by initiating the work test represented by a signal upon a determination that the signal represents a logical service request.

DESCRIPTION OF THE DRAWINGS

These and other objects and features of the invention will be more readily understood upon a reading of the following description thereof taken in conjunction with the drawing in which.

Figure 1A:
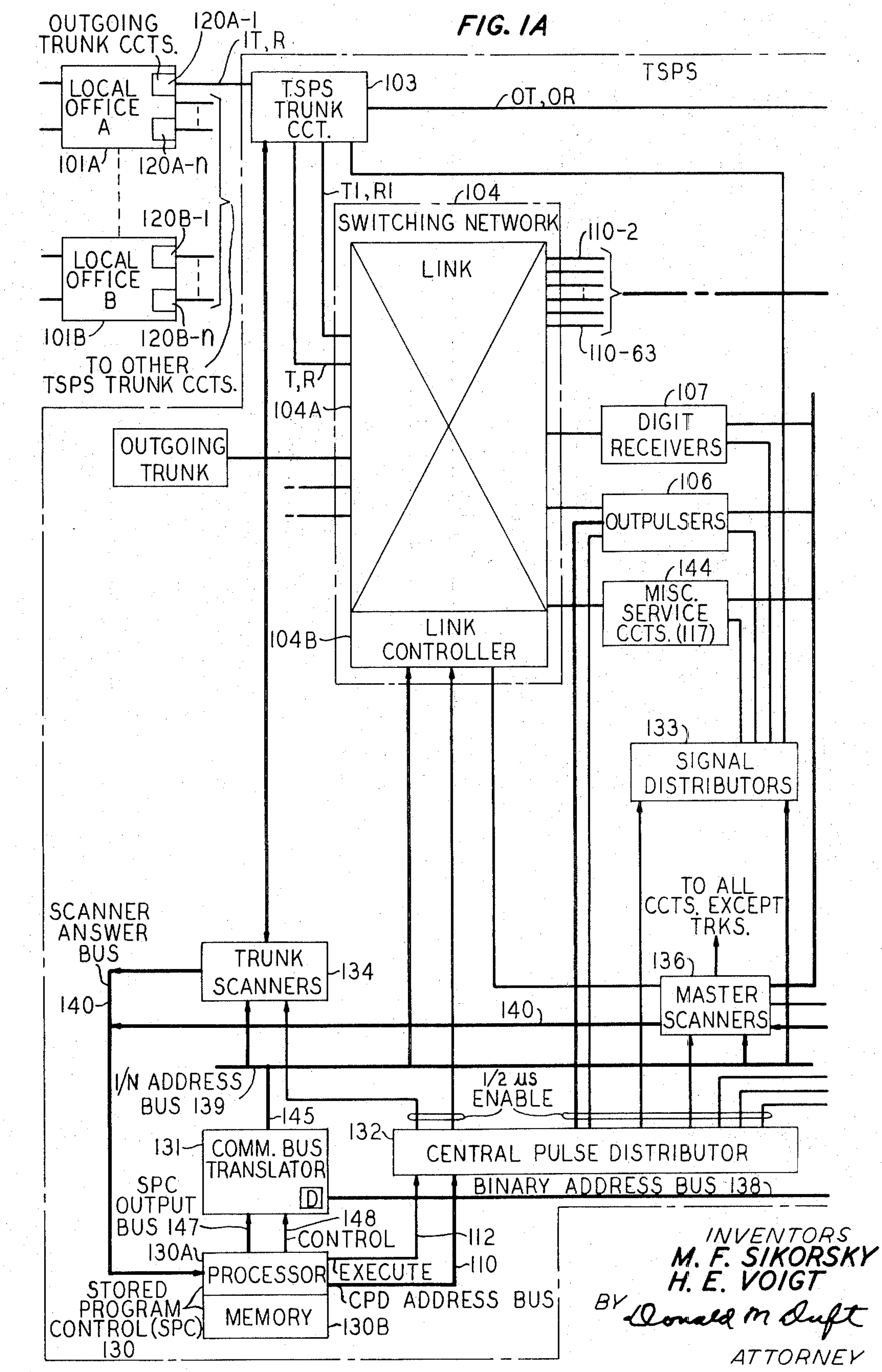
FIGS. 1A and 1B diagrammatically disclose a system in which our invention may be embodied.
Figure 1B:
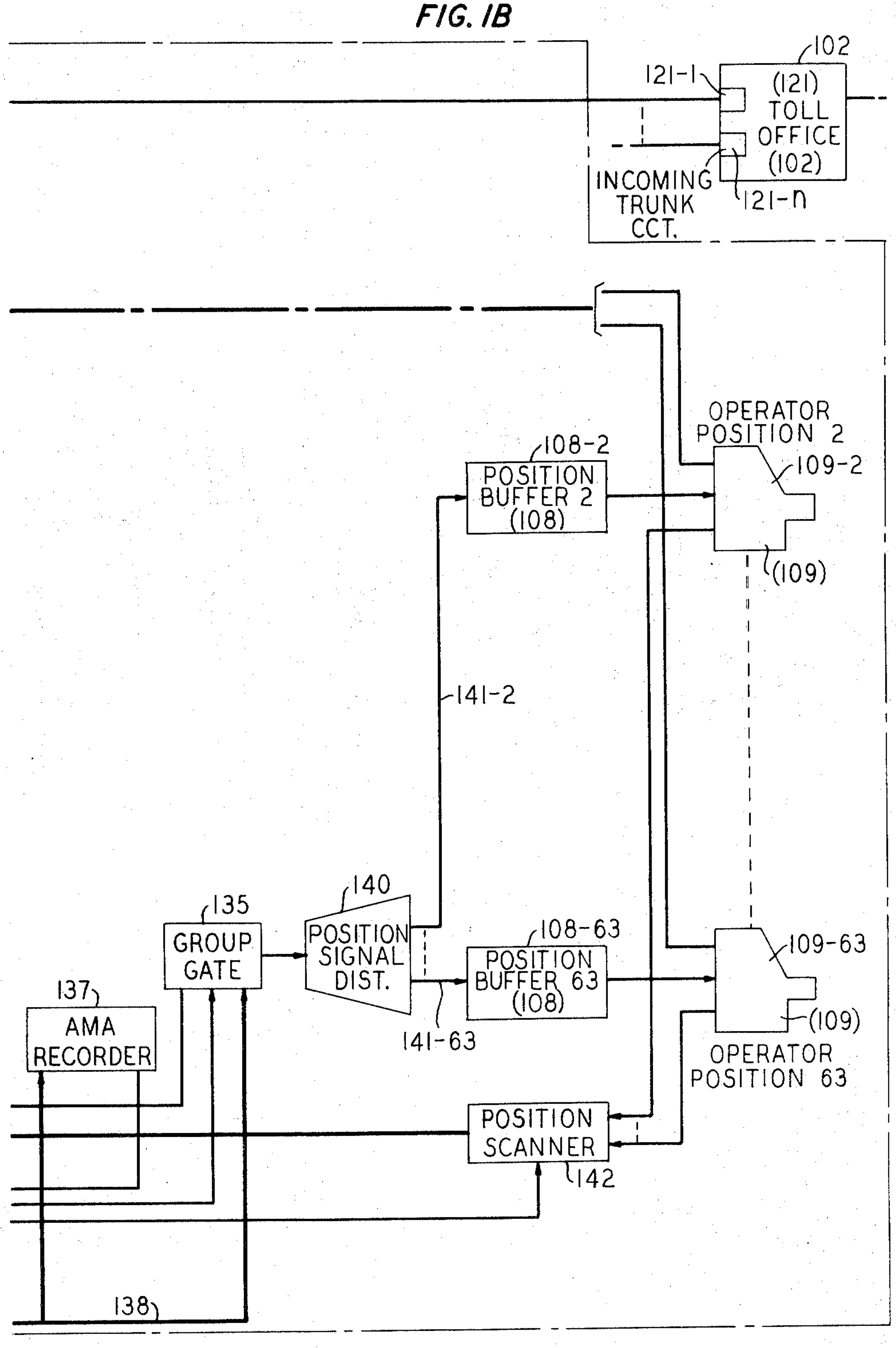

GENERAL DESCRIPTION—FIGS. 1A and 1B

Figure 1C:
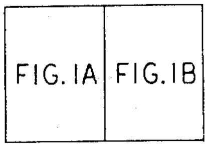

FIGS. 1A and 1B diagrammatically disclose the system shown in the aforementioned Jaeger-Joel specification which is hereby incorporated as part of the present application to the same extent as if fully disclosed herein. Our invention may be ideally embodied in a system of this type. Shown on FIG. 1 is a TSPS center 100 connected between the local offices such as 101A, 101B, and toll office 102. The TSPS equipment functions to provide the services required above and beyond the extension of a connection to the called station on customer dialed person-to-person and other special service types of calls originating in the local offices and extended to the toll office.

The TSPS center contains a plurality of trunk circuits 103 (of which only one is shown) each of which is connected on its incoming side to a corresponding one of local office outgoing trunk circuits 120A–1 through 120B–*n* and on its outgoing side to a corresponding one of toll office incoming trunk circuits 121–1 through 121–*n*. Each outgoing trunk circuit at the local office is individual to a different TSPS trunk circuit and, in turn, to a different one of the toll office incoming trunk circuit. Each call from a local office is extended via a selected outgoing trunk circuit to its associated TSPS trunk circuit, and, in turn, to its associated incoming toll trunk circuit.

The TSPS center further includes a switching network 104, which is connected on its left side to trunk circuits 103, outgoing trunk OGT and on its right side to various other circuits, such as outpulsers 106, digit receivers 107, positions 108-, and miscellaneous other circuits which, for the purpose of this figure, are represented generally as miscellaneous service circuits 117. Switching network 104 includes link 104A, which contains the circuit paths required to interconnect the circuits having left side network appearances with those having right side appearances. The network 104 further includes network controller 104B, which controls the operation of the link in its path-establishing function.

Each TSPS trunk circuit 103- is connected by means of two separate conductor pairs to two separate link appearances on the left side of link 104A. Conductor pair T and R connects the incoming side of the trunk circuit to the link. This permits the circuits on the right side of the link to communicate with the local office. The T1 and R1 conductor pair connects the outgoing end of the trunk circuits to the left side of the link. This permits the circuits on the right side of the link, such as for example, outpulsers, to communicate with the toll office.

Digit receivers 107 receive call information outpulsed from a local office. These receivers may be of different types, such as for example, DP or MF, depending upon the mode of outpulsing utilized. Outpulsers 106 transmit to the toll office the information it needs on each call. AMA recorder 137 records pertinent charge data upon the termination of a call in response to information received.

The TSPS center furnishes the call services required of it simultaneously with the extension of the connection to the toll office. This service may include the attachment of an operator position 109- to the calling TSPS trunk circuit, via the link, if operator assistance is required. The operator position is disconnected from the call when the required assistance has been furnished. The calling and called stations remain connected via the TSPS trunk circuit for the call duration. The system monitors and times the call and, upon its termination, causes recorder 137 to perform a charge data recording operation.

Each operator position contains a plurality of keys which may be selectively depressed to generate call information when the position is temporarily bridged onto a call connection by means of network 104. In addition to the signals received from the operator positions, the system receives supervisory signals from the trunk circuits 103, and it further receives internally generated signals indicating the current state of the various elements of the system. All of these signals are used by the system in its call serving activities.

The circuits that control or assist in controlling the TSPS system include stored program control 130, hereinafter referred to as "SPC," communications bus translator (CBT) 131, central pulse distributor (CPD) 132, signal distributor 133, trunk scanners 134, master scanners 136, group gate 135, and position signal distributor 140. The system of the invention shown on FIG. 1 comprises an electronic stored program controlled system which utilizes many circuits similar to those shown in detail in the copending application to A. H. Doblmaier et al., Ser. No. 334,875, filed Dec. 31, 1963, now U.S. Pat. No. 3,570,008, Doblmaier et al. discloses an electronic type local office which is controlled in its operation by a real time stored program processor. The Doblmaier et al. system is also disclosed in detail in the entirety of the Sept. 1964 issue of the *Bell System Technical Journal*.

The SPC may be considered to be the "brain" or basic controlling mechanism for the entire TSPS center. It comprises a stored program real time machine having a processor 130A and a memory 130B. The processor performs arithmetical and logical operations on the data it receives from the memory, as well as on the data it receives from circuits external to the SPC, such as for example, from the scanners. As described in Doblmaier et al., as well as in Jaeger et al., the SPC receives signals from its memory and from the scanners, performs arithmetical and logical operations in response to the received signals, and generates output commands which are transmitted to other circuits to control them in the performance of their required call functions. The circuits which respond to the SPC output commands are referred to as "peripheral circuits" since they are peripheral, or external, to the SPC.

The SPC communicates with the peripheral circuits by means of communication paths referred to in this specification as "busses." The busses which transmit the SPC commands to the various peripheral circuits are the 1-out-of-N address bus 139 and the binary address bus 138. The SPC transmits its output commands in binary form directly to the CBT over paths 147 and 148. The CBT applies the binary information to the binary address bus system. The CBT also translates the SPC binary output into a plurality of 1-out-of-N information bits and applies these to the 1-out-of-N address bus system. Thus, for each binary command received, the CBT applies a corresponding binary command to the binary address bus and, in turn, to the peripheral circuits served by this bus. Simultaneously, a 1-out-of-N type command is applied to the 1-out-of-N address bus and to the peripheral circuits it serves.

The trunk scanner monitors the current state of each trunk circuit and, upon command, reports its findings to the SPC. The trunk scanner is connected to a plurality of circuit points within each trunk circuit and each such circuit point in turn, is individually connected to a different sensing device, termed a "ferrod" in the scanner. Each ferrod has a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing state of each circuit. The master scanners are similar to the trunk circuit scanners except that they monitor the operational states of circuits other than trunk circuits. These include the service circuits, the digit receivers, and coin control circuits connected to the right side of the position link. Ferrods are further described, inter alia, in the Baldwin-May U.S. Pat. No. 3,175,042 of Mar. 23, 1965.

The scanner ferrods are arranged into rows of 16 ferrods each. Each command received by a scanner specifies a ferrod row that is to be interrogated. The information resulting from the interrogation is transmitted to the SPC over bus system 140, designated "scanner answer bus." With this arrangement, the transmission of a command to the scanner instructing it to interrogate a particular row of ferrods, causes information to be transmitted back to the SPC signifying the current state of all circuit points within the system to which the plurality of ferrods in the interrogated row are connected.

The signal distributor 133 comprises a translator whose function is to receive the microsecond type signals from the CPD and the 1/N address bus and, in turn, transform them into signals having the persistence required to operate and release magnetic latching relays and the circuits which utilize relays. These relays are primarily contained in the trunk circuits and in the service circuits. Signal distributors are further described in the aforementioned issue of the *Bell System Technical Journal*, as well as in the Jaeger-Joel specification.

The switching network 104 operates in response to the reception of the coincidentally received signals from the CPD and the 1/N address bus system. These commands cause them to establish link connections between their left side and right side appearances. The paths by which these connections are to be established are not determined by the links but, instead, by the SPC in response to the information it receives from its memory. Switching networks of the type suitable for use with the present invention are disclosed in detail in the aforementioned issue of the *Bell System Technical Journal*, as well as in the patents cited in the Jaeger-Joel specification.

The function of group gate 135 is to control the operation of the position signal distributor 140 in response to commands received from the binary address bus 138. These commands represent lamp information that is to be transmitted to a particular operator position to assist the operator in serving a call currently at her position. The position signal distributor is similar to the signal distributor 133 in that it comprises a translator which receives the group gate output signals and translates them into signals having the persistance required to operate or release magnetic latching relays in the position buffer circuits 208-. Each position buffer circuit contains the relays required to control the lamp displays at its associated operator position.

Position scanner 142 transmits key signal information from the positions via the master scanner to the SPC. Each position circuit contains a plurality of keys which may be depressed by an operator to generate call information or service requests. This information may comprise numerical data, such as calling and called numbers; it may comprise call charge data signifying the type of service requested by the calling party; and it may also comprise call status information, such as for example signals requesting the disconnection of the operator position from the call. Position scanner 142 is connected to each key in each position and, by virtue of these interconnections, it continually monitors the state of each key. In response to the depression of any key at any position, it transmits signals back to the SPC, via the master scanner, signifying the key that is depressed as well as the position in which the key is located. The position scanner is shown in detail in the Jaeger-Joel specification, as well as in the G. Riddell application, Ser. No. 537,224, filed Mar. 24, 1966, and now U.S. Pat. No. 3,529,090, issued Sept. 15, 1970.

The SPC performs its function of controlling the system operation on each call in response to the signals it receives from the various scanners. From the trunk scanners 134, the SPC receives information including supervisory signals indicating the on- or off-hook status of the calling and called stations. From the master scanner 136 the SPC receives the operator key action signal information as well as information regarding the status of many circuits of the system including the link, the service circuits, outpulsers and digit receivers. The SPC also uses signals that are internally generated by its as it operates under control of its memory as well as to the signals received from the scanners. The SPC receives signals from these various sources, and utilizes them to perform its required function of controlling the call serving activities of the system in an ordered manner.

GENERAL DESCRIPTION

Figure 2:
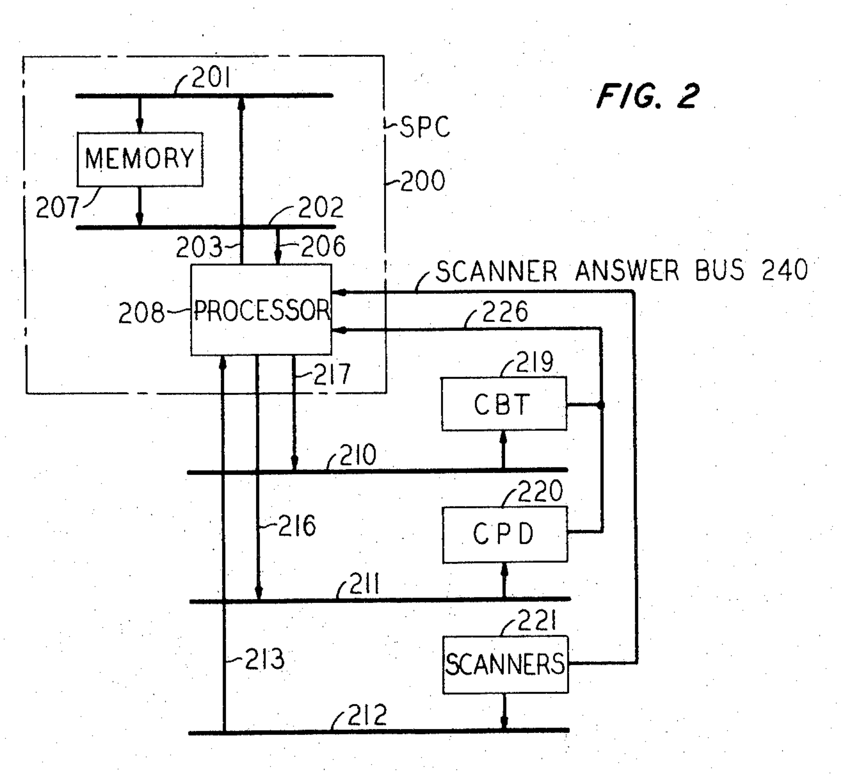
FIGS. 2 and 3 diagrammatically disclose a stored program controller including a processor that may ideally be used in embodying our invention.
Figure 3:
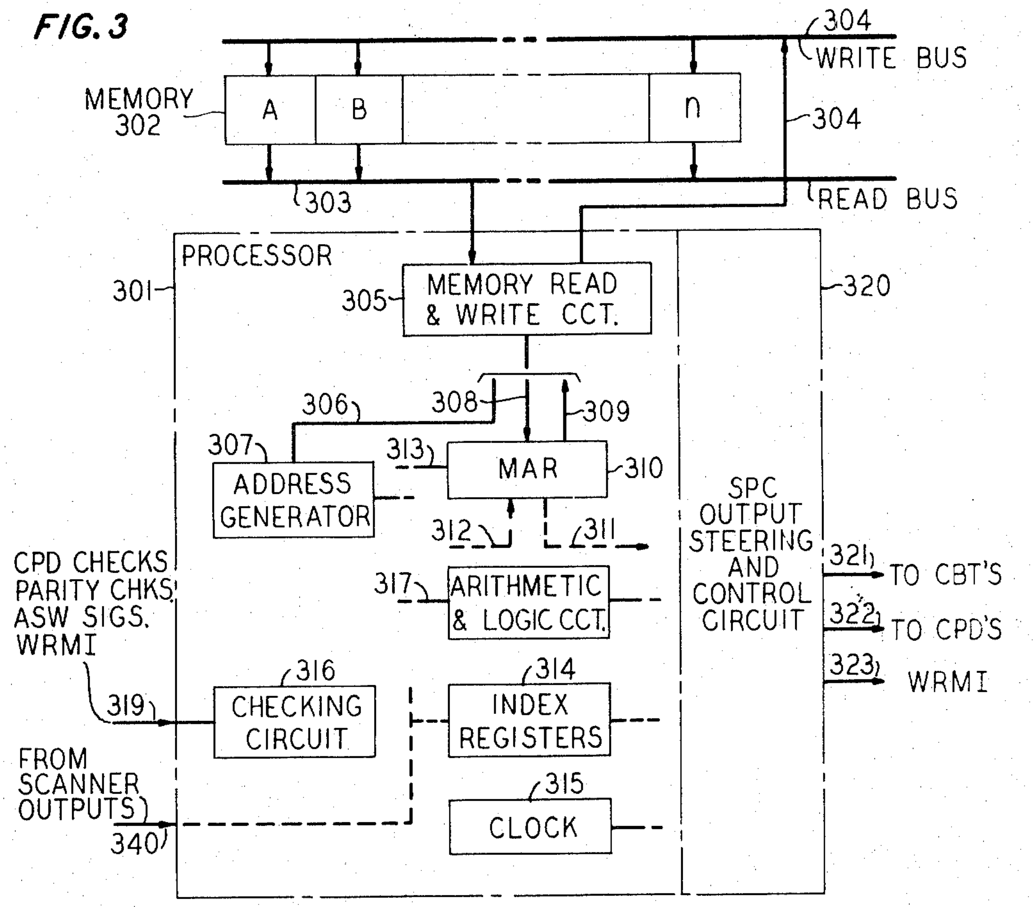

Stored Program Controller (SPC)—FIGS. 2 and 3

The SPC, shown as element 130 on FIG. 1A, is a stored program machine having a processor 130A and a memory 130B. The memory stores both program instructions and data. All instructions, and some data, are stored on a relatively permanent basis and are changed only infrequently. Other of the data is relatively temporary in nature, and it may be entered into memory, modified and erased during the serving of a call. The program instructions provide the intelligence necessary to instruct the processor in the many functions required of it under any of the many call situations it may encounter. The processor monitors and controls peripheral equipment by performing logical and/or arithmetic operations on data temporarily stored in registers within it, under control of the program instructions, and by transmitting to the peripheral equipment output information or commands generated while performing these operations. Although the processor may perform many different functions, it is capable of executing only one instruction at a time under control of the memory.

The SPC either directly or indirectly controls the operation of every circuit in the system. All commands specifying an operation in another circuit originate within the SPC and all answers signifying the existing operational state of many circuit points within the system are returned to the SPC. Certain instructions result in actions which are entirely confined within the SPC. For example, an instruction or series of instructions may command the SPC to perform logical and/or arithmetic operations on the data currently contained within it. Other instructions may cause the SPC to command a peripheral circuit to perform an operation which results in an answer being sent to the scanner to read or interrogate a specific row of ferrods. The results of the interrogation are transmitted over the scanner answer bus back to the SPC, where the information is stored temporarily either in memory or in index registers within the processor until it can be later utilized.

The SPC communicates primarily with the CBT's (communication bus translators), the CPD's (central pulse distributors), and the scanners. The output signals of the SPC are commonly referred to as "commands" since they cause the circuit receiving them to perform the operation specified by the command. The commands transmitted to the CBT's are applied over circuit paths 147 and 148 and they instruct the CBT's to apply their own output commands to the address busses which, in turn, transmit them to the peripheral circuits to which they are connected. The SPC output commands are received by the CPD's over circuit paths 110 and 112 and they instruct the CPD's to unlock the receiving portion of a specified circuit in order that it, and only it, may receive and register the command currently on the address bus to which the specified peripheral circuit is connected.

The scanner answer signals are transmitted over the scanner answer bus 140 back to the SPC. The information represented by these signals signifies the current state of many circuit points within the system. Each such circuit point is associated with an individual ferrod in the scanner and the plurality of ferrods within a scanner are divided into rows.

FIG. 2 discloses in greater detail the relationship between an SPC 200 and the circuits with which it communicates. The processor 208 retrieves either data or instructions from memory 207 by a read operation and it enters information into memory by means of a write operation. The input bus for memory 207 is element 201; the output bus is element 202. FIG. 2 also discloses CBT 219, CPD 220, and a plurality of scanners which are represented generally as element 221. The processor transmits commands to the CBT over bus 210 and to the CPD over 211. It receives information from the scanners over bus 240 and from the CBT and CPD over bus 226.

Additional details of the SPC are shown on FIG. 3. This figure discloses a processor 301, a memory 302, the circuit paths interconnecting these two elements, as well as the circuit paths interconnecting the processor with circuits external to the SPC.

Memory 302 is functionally subdivided into a plurality of portions designated A, B...*n*, each of which stores the program and data required to enable the SPC to perform the many separate functions required for the operation of the system. The Memory Read and Write Control Circuit 305 within the processor controls the operations required to read data and instructions out of and enter data into memory. The information to be written into memory is applied to it over bus 304 from the output of circuit 305. Similarly, the information that is read from memory is applied by means of bus 303 to circuit 305. Each portion of memory is represented by an address, as is typical in stored program machines, and therefore in performing each read and write function, circuit 305 obtains the address of the pertinent portion of memory from address generator 307 over path 306. The memory access register MAR 310 transmits to circuit 305 the information that is to be entered into memory on write operations, and on read operations it receives from circuit 305 the information extracted from memory. The information the MAR 305 receives from memory on a read operation is transmitted to other elements (not shown) within the processor over path 311. Similarly, the MAR receives from these other elements the data that is to be entered into memory on a write operation over path 312.

Since the details of the processor comprise no part of the invention, many of the elements with which the MAR communicates are shown only diagrammatically. However, included in the processor is the circuitry required to operate upon and manipulate the data stored within it so that both logical and arithmetic operations may be performed. This circuit is represented generally by the box entitled Arithmetic and Logic Circuit and shown as element 317.

The index registers 314 cooperate with circuit 317 to perform arithmetic and logical operations upon the data received by the processor both from memory and from circuits external to the SPC. The index registers are also used to receive and register temporarily the scanner answer information. This information is received over path 340 and when received, it is stored within the index registers until it may be acted upon and then either entered into memory, utilized for other purposes, or discarded. Checking circuit 316 receives the various check signals, parity signals, etc., which must be received by the SPC in response to the various commands it transmits to other circuits before it proceeds with another command. The output commands generated by the SPC are applied to external circuits by the circuit entitled "SPC output steering and control circuit" and designated as element 320. Cable 321 transmits commands from the SPC to the CBT; cable 322 transmits commands from the SPC to the CPD; and cable 323 transmits WRMI pulses to the circuits requiring them.

The SPC is shown primarily in diagrammatic form since its details comprise no portion of the present invention and since stored program controllers suitable for use in our invention are disclosed elsewhere. For example, the aforementioned Doblmaier et al., application discloses in complete detail a stored program controller which may be utilized to generate the control signals required to operate the circuits of our invention. The Doblmaier et al., stored program controller is further described in complete detail in the aforementioned *Bell System Technical Journal* of Sept. 1964, which issue is devoted in its entirety to an electronic switching system and with approximately 50 percent or more of this issue being devoted to details of the stored program controller. also, if desired, a stored program controller whose processor is shown in the Kettley et al., U.S. Pat. No. 3,370,274 of Feb. 20, 1968 may be utilized.

The processor receives the call signals and information with which our invention is concerned from the scanners and from memory. The scanner information is received over path 340 and is ultimately entered into one of the index registers. This scanner information may represent supervisory signals, it may represent information from one of the peripheral circuits to which the scanner is connected such as for example, an outpulser or a digit receiver, and it may also represent the key action signals generated at the operator positions.

The signals the processor receives from memory may represent various items of information concerning the current state or change of state of the calls served by the system. This information is normally generated by the processor and the memory, together in response to the change of state and other type signals the processor receives from the scanner. Thus, the processor may receive a supervisory change of state signal from the scanner and, in response to the receipt of this signal, it will cooperate with the memory to determine that the change of state represents an on-hook signal indicating the calling party has abandoned the call and that the forward connection should be released. Similarly, the processor may receive a relatively simple type of operator key signal requesting a release of the forward connection to which the operator is connected. In response to the receipt of this signal, the processor and the memory will together determine whether the connection may be released immediately. If it can, the processor and the memory together will generate the necessary signals that are required for transmission to the peripheral circuits to cause the release of the connection.

The illustration of the processor on FIGS. 2 and 3 is diagrammatic and general in nature since our invention is not concerned with the specific details of the processor, but rather, relates to the manner in which the processor, the memory and the rest of the elements of the system all cooperate to process the signals and information the processor receives during the performance of its call serving and system controlling function.

Detailed Description

Figure 4:
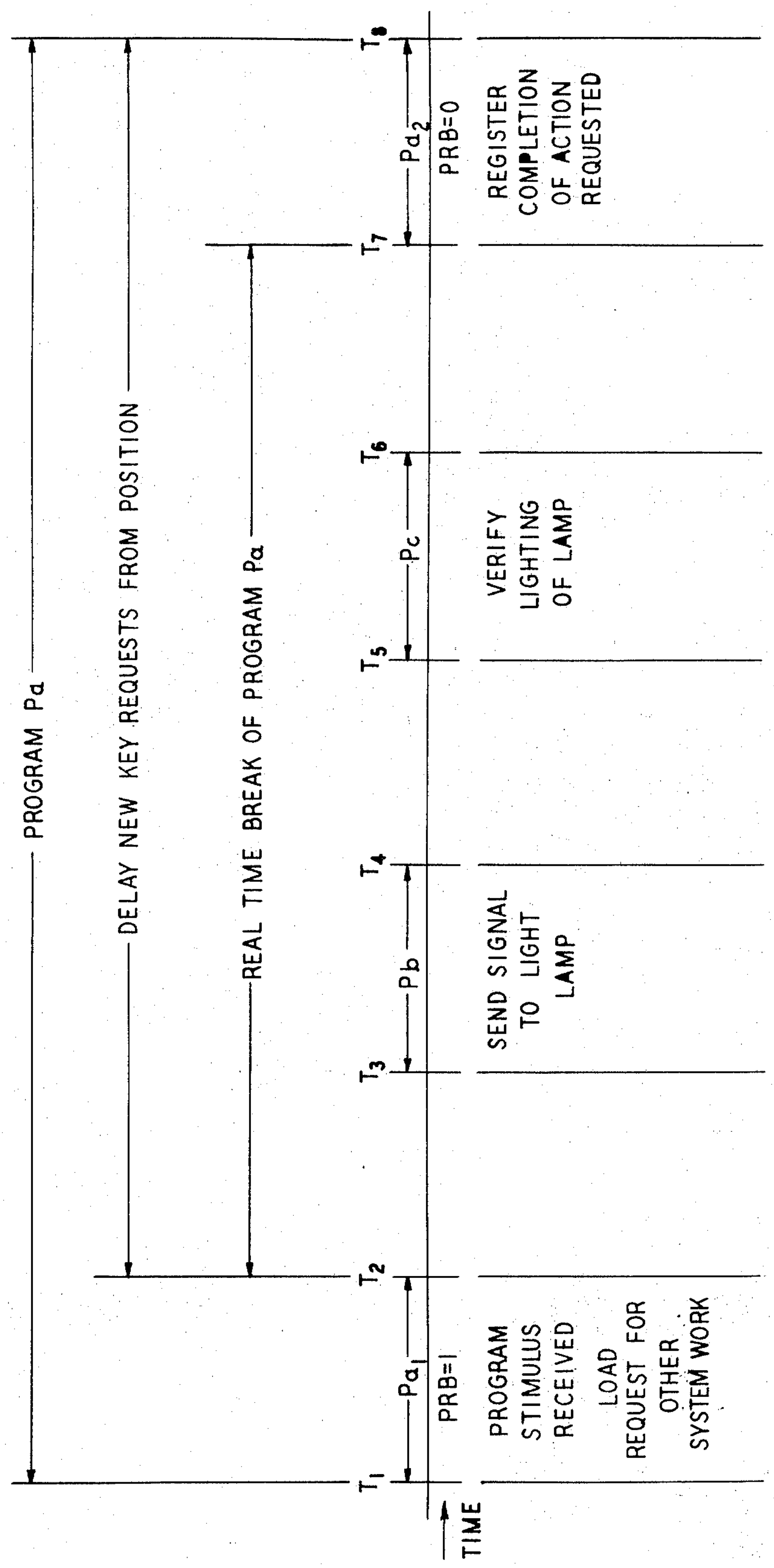
FIGS. 4 through 11 disclose the details of our invention.

FIG. 4 illustrates the manner in which task performing functions may be executed in a program controlled real time machine. It further illustrates the relationship between the various programs that might be involved in the performance of a typical function for the Jaeger, et al. system shown on FIG. 1 of the present specification. In particular, FIG. 4 illustrates the relationship between the programs that typically would be activated upon the receipt of an operator key signal that required the lighting of a lamp at the position to indicate a response by the system to the signal. The system may, of course, have other required responses, such as for example, the establishment or release of a connection. However, FIG. 4 illustrates only the system's response that relates to the lighting of the lamp subsequent to the depression of the key.

Time $T_I$ on the left side of FIG. 4 represents the time at which the key signal received by the processor from the scanner is decoded and determined to represent the depression of a particular key at a particular operator position. This determination activates program *pa* which is segmented timewise into a first part $Pa_1$ and a second part $Pa_2$. Program *Pa* is called at time $T_1$ and during the interval between time $T_1$and $T_2$, its first segment $Pa_1$ is in control of the processor. During this interval the program may perform many system functions including a determination that various connections should be established or released and that a lamp associated with the depressed key at the operator position should be lit. At time $T_2$ the program gives up control and causes the processor to initiate the actions required to perform the determined functions including the lighting of the lamp.

FIG. 4 illustrates several features that are typical of real time program controlled machines. The first is that a program may be segmented, it may have a plurality of parts and need not necessarily comprise only a single part or segment which performs all its functions in one usage of the processor. Thus, program *Pa* comprises a plurality of parts, with part $Pa_1$ being called into action in response to the key depression to perform the functions then required of *Pa*. Program *Pa* is said to give up control of the system at time $T_2$ when its segment $Pa_1$ has performed all the functions then required of it. As already mentioned, one of the functions of segment $Pa_1$ is to cause the processor to initiate the next action required to effect the lighting of the required lamp at the required position.

The interval between time $T_2$ and time $T_7$ represents a real time break of program *Pa* since it gives up control of the system at time $T_2$ and does not regain control until time $T_7$ when its segment $Pa_2$ is called to perform further functions required of program *Pa*. Thus, a single program may have a plurality of segmented parts with the time between its adjacent segments being referred to as real time breaks of the program. This same feature may be characterized differently, namely, that a program need not comprise only a single segment which, once it is called into action remains in control of the machine until it has performed all of its functions. A program could perhaps be written in this manner. However, it normally is not and in the system with which out invention is concerned, a program may be expected to have a plurality of segments.

A second feature that is characteristic of the system to which our invention pertains is that the execution of a circuit function requires the use of a plurality of programs even though the circuit function is relatively simple, such as for example, the lighting of a lamp as illustrated on FIG. 4. In other words, the lighting of a lamp, the operation or release of a relay, or the establishment or release of a connection, is not effected by a single program which remains in control from the time the request is received until the operation is completed. Instead, the accomplishment of even the simplest type of circuit action will normally require the use of a plurality of programs.

The last function performed by segment $Pa_1$ immediately prior to time $T_2$ is the placing of a request in an appropriate list in memory for the desired lamp at the required operator position to be lit. Segment $Pa_1$ then gives up control at time $t_2$. This list is subsequently read by the processor at time $T_3$. The processor performs other work functions between times $T_2$ and $T_3$. Many of these functions will have nothing whatsoever to do with program *Pa* or with the call associated with the key depression now being described. Thus, in the interval between times $T_2$ and $T_3$, the processor could perform various maintenance operations, it could scan the incoming trunks to detect new supervisory change of state signals, it could receive the digits outpulse from the preceding office, it could control the outpulsing of digits forward to the next office, etc. In short, between times $T_2$ and $T_3$, it may perform any function for which it is programmed. The only exception is that as is subsequently described, it cannot perform any work tasks requested by the depression of other keys at the same operator position if these tasks would be injurious to the call now being served by the position or if the task would represent an illogical or useless system function for this same call.

At time $T_3$, the processor reads the request generated by program segment $Pa_1$ specifying which lamp at which position is to be lit and, in turn, calls program *Pb* to perform the next operation required for lighting the lamp. Program *Pb* may, for example, control the system functions required to transmit the necessary signals to the position to light the lamp. On FIG. 1, these operations include controlling the communication bus translator and the central pulse distributor so that the signal required to light the lamp is transmitted, via the group gate and the position signal distributor, to the correct operator position. Program *Pb* gives up control at time $T_4$ when this signal is transmitted to the position.

During the interval between times $T_4$ and $T_5$, the processor may perform any of its system functions except those representing illogical or nonsensical key operations for the call being served at the position for which program *Pa* is attempting to light the lamp.

The group gate generates and transmits back to the processor a verify signal indicating that it has transmitted the signal, via the position signal distributor, to light the lamp at the position. This verify signal is detected at time $T_5$ and program P*c* is called into action. This program performs various functions, including placing a mark on a list in memory for use by program segment P$a_2$ to indicate to it that the requested lamp has been lit.

Program P*c* gives up control at time $T_6$ and during the interval between time $T_6$ and $T_7$, the processor performs other work. At time $t_7$ the mark that was placed in memory by program P*c* is read and program segment P$a_2$ is called to perform its functions. The real time break of program P*a* that began at time $T_2$ terminates at time $T_7$ and program P*a* is once again in control of the system. During the interval between time, times $T_7$ and $T_8$, segment P$a_2$ remains in control and it completes its various functions, many of which are of a bookkeeping nature, such as for example, updating the status of the call in memory to indicate that the correct lamp has been lit.

Program segment P$a_2$ completes its functions at time $T_8$ and gives up control of the processor which may then perform other work. Included in this other work that may be performed beginning at time $T_8$ is the honoring of any new key actions signals from the position at which the lamp was just lit.

It should be realized that FIG. 4 has been simplified greatly to facilitate an appreciation of the concepts to which it relates. Thus a program such as P*a* could have a far greater number segments than the two shown for it on FIG. 4. Also, the lighting of a lamp at a position may require a far greater number of programs other than the three shown on FIG. 4, namely, programs P*a*, P*b*, and P*c*. Also, programs P*b* and P*c* might well be segmented timewise in the same manner as is program P*a*. In short, it should be appreciated that the accomplishment of work tasks and circuit operations may well involve the use of far more complicated programming interrelationships than that shown for FIG. 4.

Another concept shown on FIG. 4 that should be appreciated is the fact that the duration of the real time break defined by the interval between times T2 and T7 may either be limited to a few milliseconds by the system itself, or alternatively,. it may sometimes be of indefinite duration since he system has no control whatsoever over the time at which the interval will terminate under certain conditions. Real time breaks of the first type, namely, those that are of a predetermined maximum duration are termed short real time breaks while those of an indefinite duration are termed longer real time breaks.

Short real time breaks are said to be of a predetermined maximum duration since the duration of the break is dependent solely upon the speed at which the processor performs a predetermined sequence of work functions. The duration of this short real time break may vary in accordance with the number of calls being served by the system but nevertheless, even in the heaviest of traffic, it still only takes the processor a predetermined maximum time to perform the tasks defined by the short real time break. A short real time break will typically have a duration of a few milliseconds or at the most a few hundred milliseconds.

A longer real time break is said to be of indefinite duration since the system has no control over the time at which the break will terminate. Real time breaks of this type occur, for example, when the processor places a position on queue for an available facility, all of which are currently busy, or when the processor causes the position to wait for the return of a signal from another office, such as for example. a sender attached signal from the toll office. It may be appreciated that neither the processor nor the position has any control over the time in which an idle facility of this type may become available. The duration of the queuing interval during which the position waits for such a circuit may be seconds, or even minutes, or hours, depending upon the patience of the operator and the calling customer.

Figure 5:
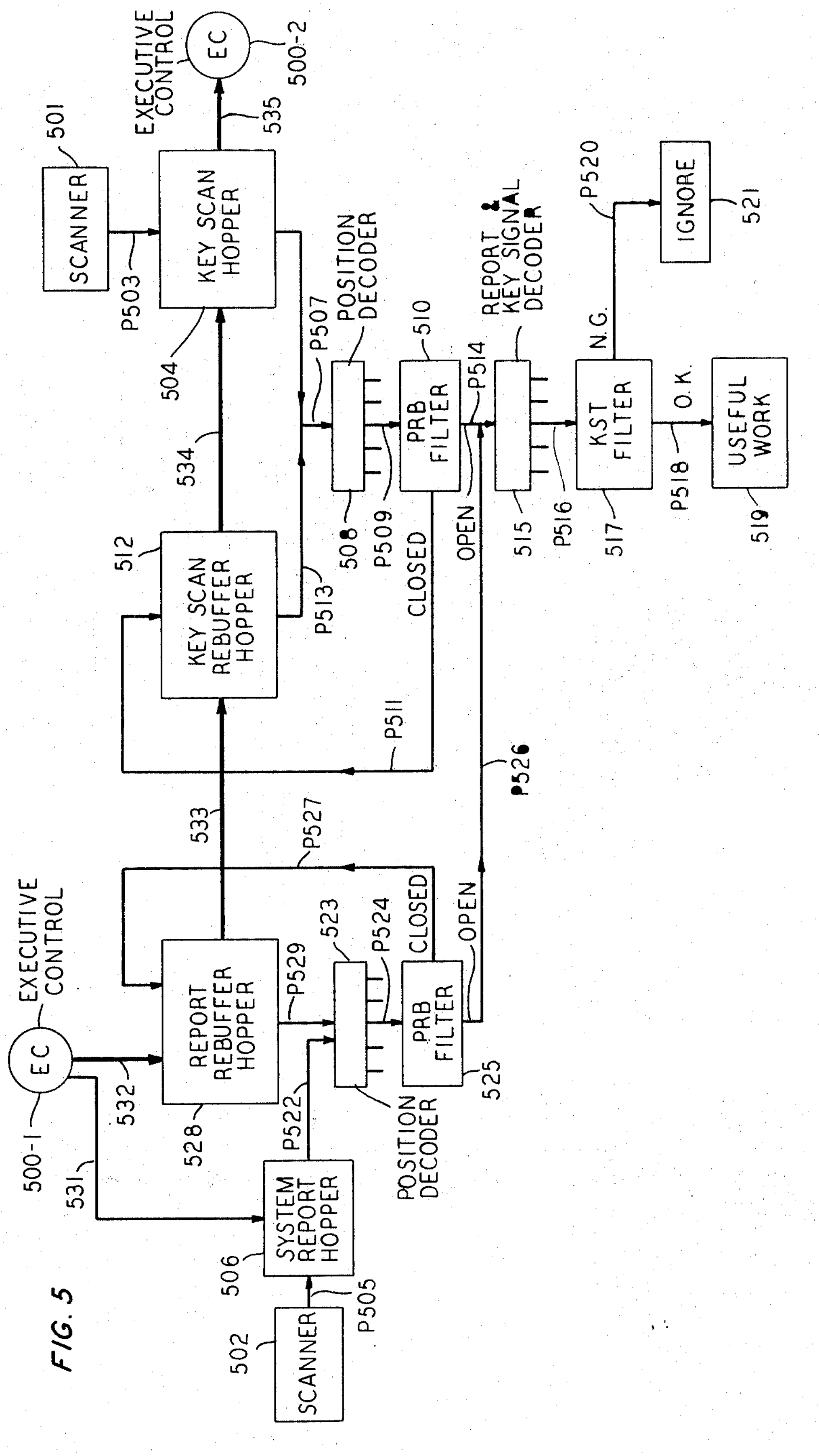

FIG. 5 illustrates the manner in which call signals are received from various sources and are then analyzed to determine whether they should be utilized or disregarded. The processor receives operator key action signals from the scanner. It also receives other types of call signals, such as supervision, outpulsing complete, sender attached, etc. These latter types of signals are generated by the processor jointly in response to changes of state signals it receives from a scanner as well as in response to other information in memory, pertaining to the current and prior state of the call. Thus, a change in supervision may represent a line hit, a customer flash, an abandonment of the call, etc. The processor receives each new change of state signal, and, from the prior call state determines the new call state.

On FIG. 5, the operator key action signals are received by scanner 501 which corresponds to scanner 136 on FIG. 1A. This scanner is read periodically and as the signals from it are received by the processor, it determines that they represent key action codes and transfers them from its index registers to a portion of memory designated as the key scan hopper 504. The path interconnecting scanner 501 with the key scan hopper 504 is designated P503. This designation and in particular the prefix P portion of the designation indicates that the information in the scanner does not go directly from the scanner to the key scan hopper. Instead it is transferred via the processor to the key scan hopper as a consequence of the processor performing the necessary logical operations and manipulations on the received signals to convert them to the proper form and enter them into the key scan hopper. Similarly, the supervisory change of state signals are detected by scanner 502 and received by the processor where the signals are analyzed and converted into more useful information signifying the new call state resulting from the supervisory signal. This information is, in turn, entered into the system report hopper 506. The designation P505 for the path that interconnects scanner 502 with the system report hopper 506 also indicates that the information is extracted from the scanner and entered into the hopper under control of the processor. The same is true of all paths bearing a "P" designation.

The operator key signals received and the supervision signals are of limited persistence. In other words, scanner 501 receives the key action signals only as long as the operator maintains the key depressed. Similarly, scanner 502 receives a supervisory change of state signal only as long as the associated trunk remains in the condition represented by the signal. The processor operates under control of executive program 500 so that it interrogates the scanners periodically at a rate sufficient to insure that no scanner signal is lost. Scanners are considered as being external or peripheral to the processor and its memory. Thus, the processor periodically interrupts its other activities every 100 milliseconds to go into a mode known as an input-output I/O interrupt in which it receives information from outside circuits such as the scanners. At this time it also causes output signals to be transmitted to the peripheral circuits. Following the I/O interrupt, the processor reverts to the mode of operation in which it was before the initiation of the interrupt and it continues on with the duties it was then performing.

The programs that control the processor are arranged in a structured hierarchy consisting of base level programs and interrupt level programs. Base level programs generally represent work tasks that may be temporarily deferred. Interrupt level programs represent tasks that must be preformed periodically and that cannot easily be deferred. The base level programs themselves may be arranged in a hierarchy of various classes in accordance with the importance of the work function represented by each program and the rate at which it is to be performed by the processor. Similarly, the interrupt level programs are arranged in a hierarchy in accordance with the importance of the task performed by each program. The base level work is interrupted periodically under control of a clock to force the processor into an interrupt mode in which it operates under control of the appropriate interrupt program.

I/O operations are performed on an interrupt level since these cannot be deferred. On an I/O interrupt, the processor receives information from the scanner and loads it in various hoppers; it further causes signals to be transmitted to peripheral circuits by unloading buffers containing the signals that are to be transmitted to the peripheral circuits. The processor reverts back to the base level programming after it finishes performing interrupt level work.

The foregoing has only briefly described the organization of the programs that control the processor. Further details of the program organization are shown in the Sept. 1964 issue of the *Bell System Technical Journal* and in particular, in the portions beginning on pages 1,923 and 1961 of that issue.

The operation of the system of FIG. 5 in response to the reception of an operator key signal is first described with the assumption that no signals for the same call are currently received from scanner 502 or system report hopper 506. The key signals from the operator positions are received by scanner 501 and, on I/O interrupts, are transferred over path P503 to key scan hopper 504. Subsequently, the I/O interrupt terminates, the processor reverts to base level actions and ultimately is placed under control of a program which unloads the key scan hopper one entry at a time. As each entry is unloaded, it is transferred via path P507 to the input of position decoder 508. The decoder analyzes the signal, determines the position at which the signal originated, and applies the signal over one of its output conductors to a PRB filter 510 unique to the position that generated the signal. There is one such filter for each position. Each PRB filter is essentially a two-state steering arrangement that may assume the values "1" or "0." The filter is said to be opened when it is in its "0" state and at such times, each signal received at its input is applied to path P514 for transmission to the input of the report and key signal decoder 515. The filter is said to be in a closed state when it is set to a value of "1" and at such times each signal received at its input is applied over path P511 to the key scan rebuffer hopper 512.

A PRB filter is normally in an "0" or open state, but is set to "1" whenever any processor action is initiated by a priorly received key signal from its associated position. The "1" state of the filter indicates that the processor cannot currently activate any base level program associated with a newly received key signal from its position since it has not yet completed the task associated with a priorly received key signal from the same position. Therefore, all key signals received from the position associated with PRB filter 510 while it is in its "1" or closed state are entered into the rebuffer hopper 512 sequentially in the same order in which they are unloaded from the key scan hopper 504. Meanwhile, key signals from other positions are received and unloaded from hopper 504 and are applied to their respective PRB filters via the position decoder 508. Each signal encountering a closed PRB filter is entered into hopper 512 in the manner described.

Subsequently PRB filter 510 is set to "0" and the next key signal applied to its input is extended over path P514 to the input of decoder 515. A PRB filter may be set to "0" either when the processor completes its work for a priorly received key action signal from its position or during a long real time program break for a priorly received signal. The simplest situation to understand occurs when the PRB filter is set to "0" at the termination of a key action program. At that time, the next signal received by the filter is extended over its output conductor P514, through the signal decoder 515 and through the KST filter system 517 and path P518 to "useful work" element 519. This element represents generally the programs that may be activated by the various key signals. Thus, whenever a PRB filter is open, the next key signal it receives passes through the filter; if it also passes through the KST filter, it activates the program with which the key signal is operatively associated.

Figure 6:
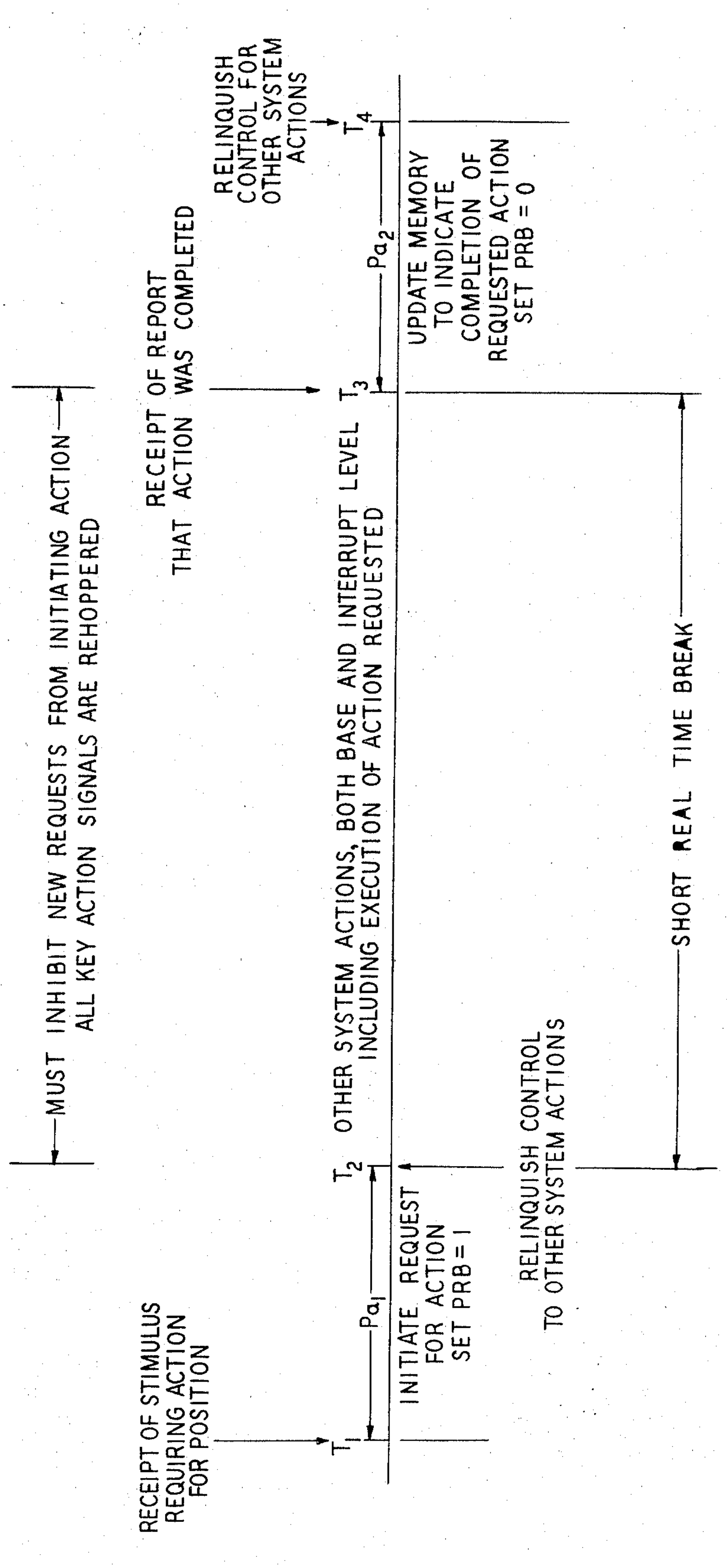

FIG. 6 discloses the manner in which a key signal is processed if it is received when the processor is under control of a priorly activated key action program or during a short real time break of such a program. Time T1 represents the time at which a program *Pa* for the priorly received key signal from the same position took control of the processor. Segment $Pa_1$ is in control of the processor from time $T_1$ to $T_2$. During this interval, segment $Pa_1$ performs a number of functions including setting to "1" the PRB filter for the position that called the program. At time $T_2$, segment $Pa_1$ relinquishes control of the processor so that other system actions may take place and program *Pa* takes a short real time break during the interval between times $T_2$ and $T_3$. The other system actions that may occur at this time may include the execution of programs *Pb* and *Pc* which are shown on FIG. 4, but not on FIG. 6. In other words, if the program *Pa* on FIG. 6 requires the lighting of a lamp at the position, programs *Pb* and *Pc* of FIG. 4 will be required and they will be in control of the processor to perform their portion of the overall task of lighting the lamp. Programs *Pb* and *Pc* are not shown on FIG. 6 in order to minimize the drawing complexity and to facilitate understanding of the operation of the PRB filter.

In summary, between times $T_2$ and $T_3$, program *Pa* takes a short real time break during which the system performs many functions including those not related to program *Pa* or even to the call for which program *Pa* is currently attempting to complete a work function. During this interval, it should be apparent that although the processor may perform certain other tasks for the currently described call, such as detecting or recognizing supervisory change of state signals, it cannot respond to any new work requests since it has not yet performed the work required by the receipt of the last key action signal. During the interval between times $T_2$ and $T_3$ all key action signals for this position that are unloaded from the key scan hopper are reloaded into the key scan rebuffer hopper 512 since the PRB filter for the position has been set to "1."

Subsequently, the processor completes all of the system actions requested by program segment $Pa_1$ and at time $T_3$, segment $Pa_2$ assumes control of the processor to complete the remainder of the task for which program *Pa* was called. Included in these tasks are the setting of the PRB filter for the position from "1" to "0." This action is completed during the interval between times $T_3$ and $T_4$. At time $T_4$, segment $Pa_2$ completes its function and relinquishes control of the processor so that other system action may take place. Immediately subsequent to time $T_4$, the next key signal received by the PRB filter will pass through it and to the KST filter to possibly activate the base level program for the key. This signal may be received either from the rebuffer hopper 512 or hopper 504. Both hoppers are unloaded periodically with preference being given to the key scan rebuffer hopper 512. Each signal is applied to its appropriate PRB filter, via decoder 508, after it is unloaded. If its filter is then set to "1" the signal is reloaded in hopper 512. If its filter is set to "0," the signal passes through to decoder 515 and the KST filter system.

The preceding has described that all key signals received when a PRB filter is set to "1 " are entered into the key scan rebuffer hopper 512; that this hopper is unloaded periodically to test the state of the PRB filter for each unloaded signal; that each unloaded signal that encounters a busy or closed filter is reloaded into hopper 512; and that any unloaded signal that encounters a busy or closed filter is reloaded into hopper 512; and that unloaded signal that encounters a PRB signal in a "b 0" state passes through the PRB filter and to the KST filter system to initiate the useful work associated with the key signal.

The PRB filter for a position may be opened and set to "0" not only upon the termination of a key program as priorly described, but also, upon the initiation of a long real time break for a key action program. The following paragraphs describe the system operation and the manner in which the key signals are processed during such conditions.

First of all, and as already mentioned, it should be appreciated that a long real time break may be of an indefinite duration over which the processor has no control. Such an example would be when the processor places a position on queue for the availability of other facilities which may be available instantly, or may not be available for a matter of seconds, minutes, et cetera. Both the key scan hopper 504 and the key scan rebuffer hopper 512 are of limited capacity and it would not be feasible to have them store all the key signals that may be received from a position during a long real time program break. Therefore, in accordance with our invention, the PRB filter is opened under such conditions so that any unloaded key signal may be applied to the KST filter to determine its disposition.

Any key signal received during a long term break may be classified into one of two categories. Specifically, each signal will either represent an illogical service request that has no meaning in view of the current state of the call or, alternatively, it will represent information which is of extreme significance and to which the system should promptly respond. In other words, each key signal received during a long real time break for the same call will either represent useless information that can and should be disregarded or, alternatively, will represent information of value to the system even though it is currently performing a work function for the same call. An example of an illogical service request would be the depression of a key to start an outpulsing operation while the system is in the middle of a real time break of a program that is attempting to secure a connection to an outgoing trunk. Clearly, such signals should be ignored and disposed of as expeditiously as possible. Contrariwise, examples of key signals that represent useful information and that cannot be disregarded would be the depression of a key to cancel a request for an outgoing trunk for which a position is on queue and for which the position is in the middle of a long term break. The system should respond to such information since it is relevant and vital to the current state of the call. In other words, there is no point in having a position remain on queue for a trunk circuit if the operator has determined that the connection is no longer desired.

The provision of the PRB and the KST filters in accordance with our invention, permits the system to disregard illogical requests received during long term breaks and to honor only those requests then received which are relevant. The following description illustrated the manner in which the system of FIGS. 1 and 5 processes the key action signals received from a position during a long time break for a priorly activated key action signal from the same position. This description is made with reference to FIG. 7 which illustrates the time relationship between the reception of the various signals and the actions of the processor.

On FIG. 5, let it be assumed that a key signal is received from the operator position associated with PRB filter 510 at a time when the processor is not currently performing any work tasks for a call being served by the position. This key signal is initially received by key scan hopper 504 and from there is applied via position decoder 508 to the input of PRB filter 510. Alternatively, the key action signal about to be described may be currently stored in the key scan rebuffer hopper 512 and during a periodic unloading of this hopper may be applied via position decoder 508 to the PRB filter. In any event, and regardless of whether the signal arrives from hopper 512 or hopper 504, the signal is passed through its PRB filter to the Report and Key Signal Decoder 515 since filter 510 is currently assumed to be in an opened or "0" state. From thence, the signal passes through decoder 515 and through the KST filter 517 to the Useful Work element 519 to activate the program associated with the depressed key. This program is assumed to be program $Pc$ which, as shown on FIG. 7, is segmented timewise into a plurality of parts.

Figure 7:
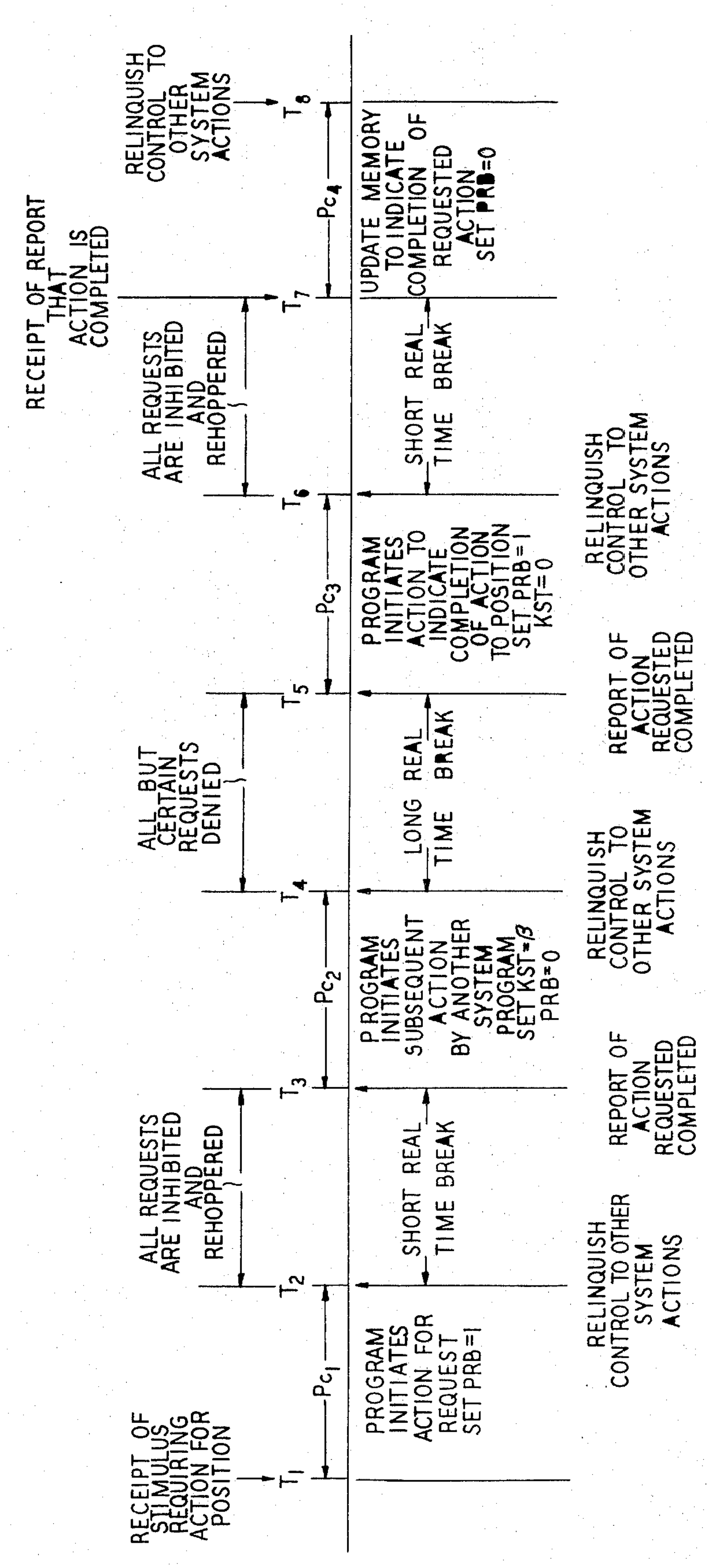

Time $T_1$ on FIG. 7 represents the time at which the key signal is received by the Useful Work element 519 to activate segment $Pc_1$ of program $Pc$. Segment $Pc_1$ is in control of the processor from time $T_1$ to time $T_2$ and, in the same manner as already described in connection with FIG. 4, it performs a number of system functions including setting the PRB filter 510 to its closed or "1" state to prevent any further key signals from being received by decoder 515 and the KSt filter for the time being. Program segment $Pc_1$ gives up control at time $T_2$ and from time $T_2$ to $T_3$ the processor performs other useful work. The interval between time $T_2$ and $T_3$ is short and represents a short real time break. During this interval, all other key signals that may be received from the same position by the key scan hopper, and unloaded from it, are applied by the PRB filter over path P511 to the key scan rebuffer hopper 512. This rebuffering of all such signals permits them to be subsequently unloaded sequentially from the rebuffer hopper in the same timewise order in which the keys were originally depressed. The rebuffering of the signals continues for the entirety of the duration between times $T_2$ and $T_3$.

The short real time break of program $Pc$ terminates at time $T_3$ when the processor has completed all of the tasks requested by segment $Pc_1$ such as for example the lighting of a lamp at the operator position. Program segment $Pc_2$ is called at time $T_3$ when the short real time break terminates. Segment $Pc_2$ initiates the processor actions required to perform the next sequence of work tasks for program $Pc$. A typical example would be the placing of the position on queue for an available facility such as, for example, waiting for an outgoing trunk (OGT on FIG. 1A). In other words, program $Pc$ could possibly have as its overall function the connection of an operator position to an outgoing trunk in response to the depression of a proper key at the position. The function of program segment $Pc_1$ and the short real time break following it could be, among other things, to light a lamp at the position indicating that the system recognized the depression of the key. The function of segment $Pc_2$ would be to perform the next series of steps required to obtain a connection to a trunk. Segment $Pc_2$ performs these functions and gives up control at time $T_4$. Immediately prior to giving up control the program sets the KST filter 517 to a unique value to indicate the current state of the call. It also sets the PRB filter 510 to its "0" state in which all key signals it subsequently receives will pass through it to decoder 515. The reason for setting the PRB filter to "0" is that the position may have to wait an indeterminate time for the availability of a trunk and it would be wasteful of real time to rehopper all key signals that may be received from the position during this interval. This time is represented by the interval between times $T_4$ and $T_5$ and it is referred to as a long real time break. During this interval, all key signals for a call that are unloaded from key scan hopper 504 or rebuffer hopper 512 will pass through the PRB filter for the position serving the call, through decoder 515 to the KST filter 517, appropriate to the key signal. This filter analyzes each such key signal, compares it with information signifying the current state of the call, and determines whether the key request is logical or illogical. If the request is illogical, its signal is passed over path P520 to the Ignore element 521 where it is discarded. Contrariwise, if the request is logical, it is passed out of the filter and over path P518 to element 519.

The long real time break terminates at time $T_5$ when, for example, a trunk becomes available. The processor is notified of this availability at time $T_5$, the long real time break is terminated, and program segment $Pc_3$ is called to perform the further work task associated with program $Pc$. This segment performs its tasks and, in connection therewith, sets the PRB filter to "1" and the KSt filter to "0" and then gives up control at time $T_6$. The interval between time $T_6$ and $T_7$ constitutes a short real time break in the same manner as between times $T_2$ and $T_3$. During this break, the processor performs further work tasks including those requested by segment $Pc_3$. All key signals then received by PRB filter for the call are rehoppered into the key scan rebuffer hopper 512. At time $T_7$ the processor completes the tasks requested by segment $Pc_3$ and call program segment $Pc_4$ to complete the remaining work tasks required by program $Pc$. Included among these are the updating of the memory to indicate the completion of the action requested by the depression of the key that called program $Pc$. The processor also sets the PRB filter to "0" so that the next key signal received from the position may be received by the KST filter system.

Figure 8:
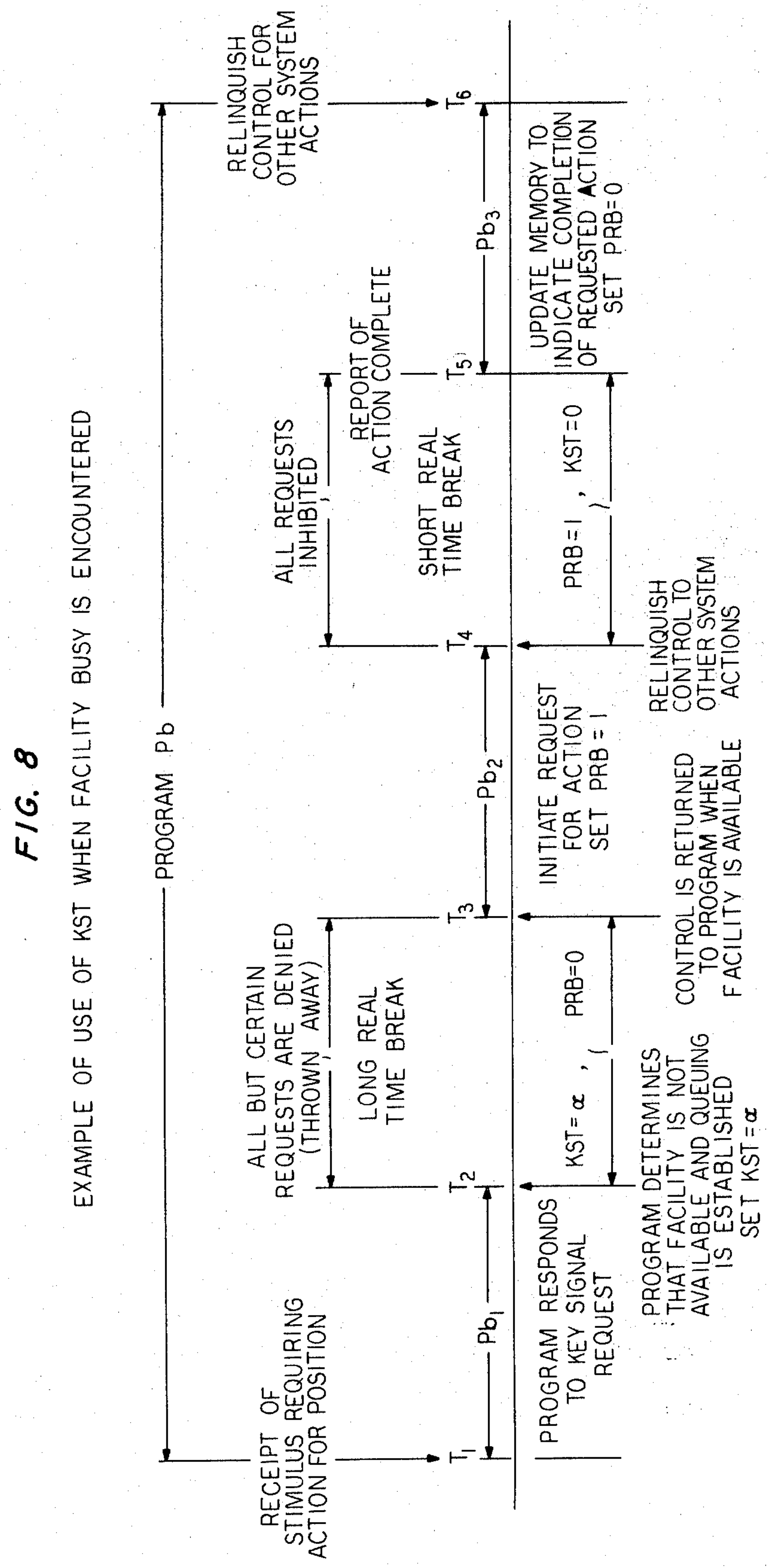

FIG. 7 illustrates the operation of the system of FIG. 5 for a program having a long real time break intermediate two short real time breaks. All programs do not operate in this manner; and the long and short real time breaks may be interspersed or arranged in any manner and in various sequences and combinations. FIG. 8 illustrates program P*b* having a long real time break followed by a short real time break. The program is called at time $T_1$ in response to the reception of an appropriate key signal. Segment P$b_1$ performs its required system functions, and gives up control at time $T_2$. Prior to giving up control, the program causes the processor to set the PRB filter for the call to "0" and the KST filters for the call to a predetermined value to signify the state of the call. As indicated on FIG. 8, program segment P$b_1$ determines that the position from whence the key depression came should be connected to a facility that is not currently available and that the position must therefore be placed on a queue until the facility becomes available. Since this time may be indeterminate, the program determines that a long real time break is forthcoming and sets the KST filter to a predetermined value and PRB filter to "0" as already mentioned.

The processor performs other work functions during the interval between times $T_2$ and $T_3$. The KST filter also analyzes any signals received during this interval. At time $T_3$ when the facility becomes available, the processor is so advised, and segment P$b_2$ is called to perform the next sequence of tasks for program P*b*. Segment P$b_2$ performs its functions, determines that a short real time break is forthcoming, sets the PRB filter to "1" and the KST filter to "0, " and relinquishes control of the system at time $T_4$.

The processor performs other work from time $T_4$ to $T_5$ and rehoppers all key signals received from the position during this interval. At time $T_5$ control is given to segment P$b_3$ which completes the remainder of the tasks associated with program P*b*. Immediately prior to giving up control at time $T_6$, the segment P$b_3$ sets the PRB filter for the call to "0" so that the next subsequent key signal will pass through the filter to the KST filter system.

The foregoing has described the operation of the system of FIG. 5 primarily with reference to the PRB filter 510 and the information this filter may receive either from the key scan rebuffer hopper 512 or the key scan hopper 504. The information that passes through filter 510 is applied to decoder 515 and from there to the KST filters 517 connected to the outputs of decoder 515.

Decoder 515 and the KST filters may also receive information from PRB filter 525 which, in turn, receives its information either from the System Report Hopper 506 or the Report Rebuffer Hopper 528 via decoder 523. As is the case for the PRB filters connected to the outputs of decoder 508, there is an individual PRB filter, such as 525, connected to each output of decoder 523. Each output of decoder 523 and each filter to which it is connected is individual to a different operator position in the same manner as is the case for the PRB filters 510. Scanner 502 detects information, other than operator key signals, for each call. This information may include supervisory change of state signals and other types of call information. It is transmitted from scanner 502 to the System Report Hopper 506 over path P505 with the assistance of the processor. The processor receives the change of state and other signals from the scanner, processes them into more meaningful type information such as on-hook, off-hook, et cetera and stores the information in system report hopper 506. This hopper is analogous to the key scan hopper 504 in that it applies its output information, via a position decoder 523, to a PRB filter 525 which, when it is in open or "0" state, passes information therethrough over path P526 to the report and key signal decoder 515. Alternatively, when PRB filter 525 is in a "1" or closed state, the information it receives from the system report hopper is stored temporarily in the report rebuffer hopper 528 over path P527. The information remains in that hopper until the PRB filter for the call to which the information pertains is opened.

Thus, the relationship between the system report hopper 506, the PRB filters 525, the report rebuffer hopper 528, and the position decoder 523 is analogous in every respect to that already described for key scan hopper 504, PRB filters 510, key scan rebuffer hopper 512, and position decoder 508. In an analogous manner, system report information is entered into the rebuffer hopper 528 when the associated PRB filter is closed and alternatively, is passed through its PRB filter, when it is open, to signal decoder 515. From the signal decoder the information passes through to the KST filter system in the same manner as already described for the key action signals. Thus, each item unloaded from hopper 528 is put in hopper 528 or applied to decoder 515 depending upon the state of its PRB filter.

Executive control 500 controls the operation of the system so that the various hoppers are unloaded and applied to the KST filters in a predetermined order of preference. Generally speaking, the information received by the system report hopper is of a greater urgency than the key scan information since the system report information may indicate call abandonments, sender attachments, and other such items of importance. The key action information is of a lesser degree of importance than is the system report information. The report rebuffer hopper is unloaded first in order to maintain the proper priority between the information in it and that in the key scan rebuffer hopper 512 and the key scan hopper 504. Each unloaded item is applied to its PRB filter and is then either reloaded in hopper 528 if the filter is closed, or is passed through the filter to decoder 515 if its filter is open. Next, after this hopper is unloaded, the key scan rebuffer hopper is unloaded followed by the key scan hopper 504. This order of priority in the unloading of the various hoppers maintain the proper timewise sequence of the received information and at the same time insures that the more important call information will be given priority.

Unloading of the system report hopper is a function of EC and is independent of the unloading of the other three hoppers. However, the PRB and KST mechanism insure that reports from this hopper will not be allowed to take action and interfere with a priorly received report from one of the other hoppers that may be presently in the process of doing work. However, since it would be rebuffered in the report rebuffer hopper, it is guaranteed to be the next stimulus worked on.

Figure 9A:
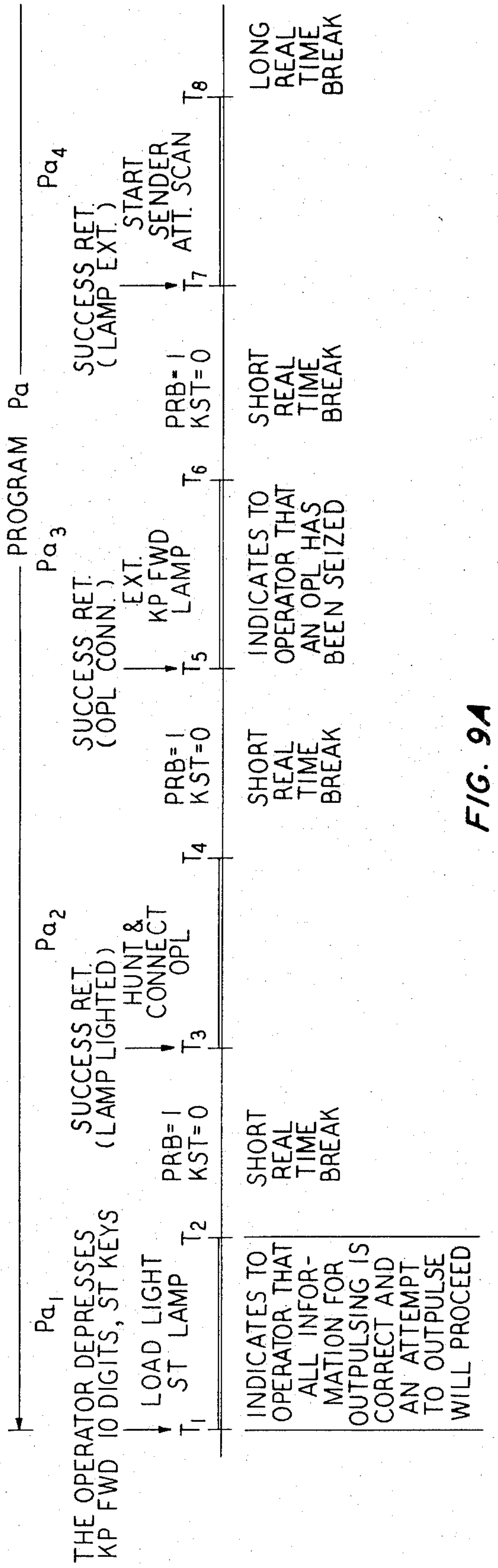
Figure 9B:
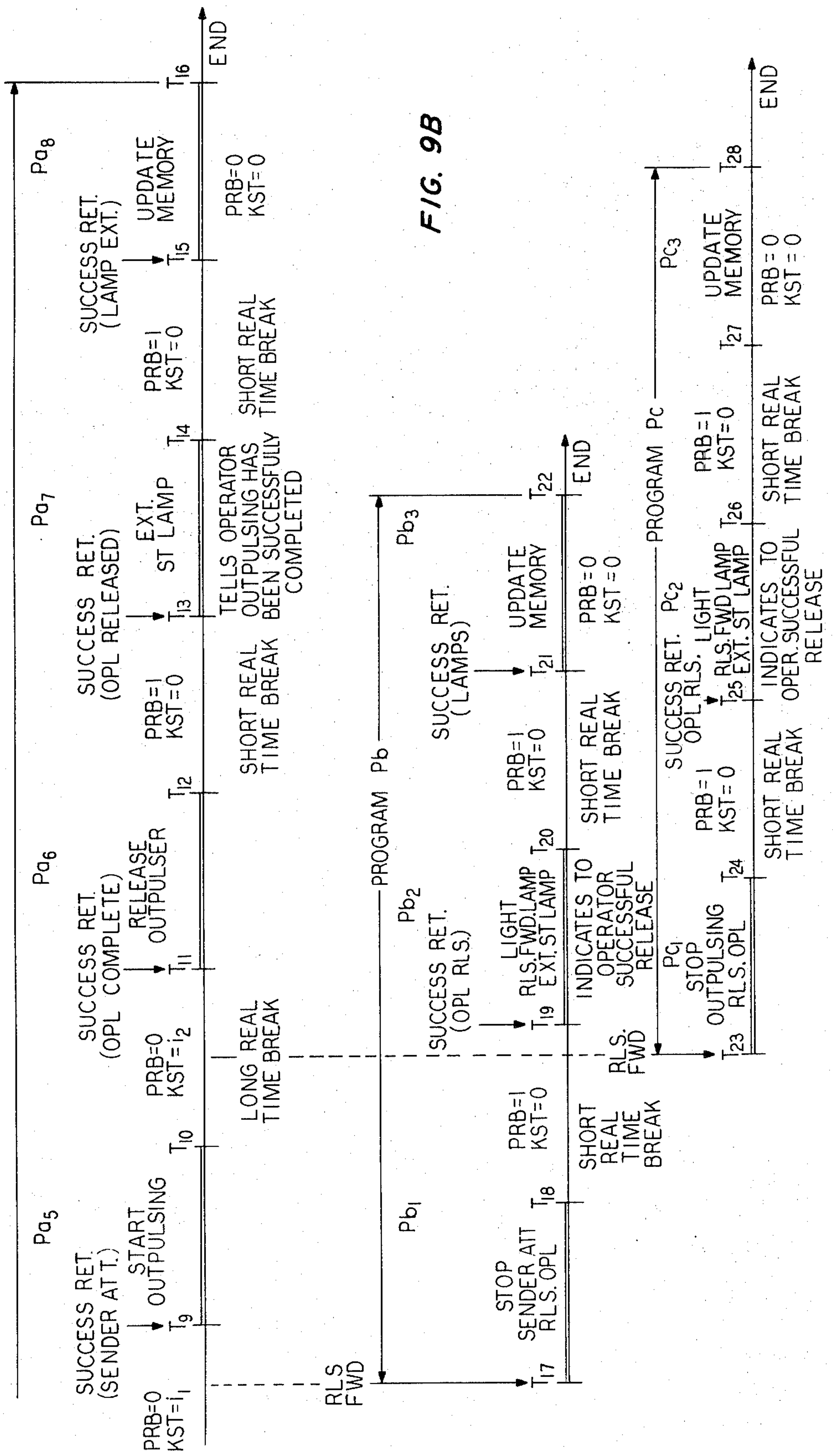

FIGS. 9A and 9B illustrate the operation of the PRB and KST filters for a typical system function. The function shown on these figures is the response by the system to the operator keying of a called number that is to be out-pulsed forward. As is typical in present day operator keying operations, an outpulsing is initiated by the depression of a KP-FWD key followed by the depression of ten separate digit keys (for a 10-digit number) followed by the depression of a ST(start) key. The system registers the depression of the KP-FWD and the digit keys and then, when the ST key is depressed, outpulses the information represented by the depressed digit keys. Time $T_1$ on the left side of FIG. 9A represents the time at which the operator keying is completed and, in particular, the time at which the signal is received indicating that the ST key had been depressed. Prior to this, the signals associated with the KP-FWD and the digit keys are received and appropriately registered by other programs. The receipt of the ST key signal at time $T_1$ calls into action segment P$a_1$ of program P*a*. Included among the functions of this segment is the loading of a request to light a ST lamp at the operator position. The segment P$a_1$ gives up control at time $T_2$ by taking a short real time break between time $T_2$ and $T_3$. During this interval, the PRB filter is set to " 1" and the KST filter is set to "0." The short real time break ends at time $T_3$ when a success signal is returned indicating that the ST lamp at the position has been lit. Segment P$a_2$ is called at time $T_3$ and its function is to select an idle outpulser and load a request that the outpulser be connected to the calling trunk circuit. This request is loaded and the function of segment P$a_2$ is completed at time $T_4$ when it gives up control and takes a short real time break between times $T_4$ and $T_5$. At time $T_5$ a signal is received indicating that the outpulser is connected and segment P$a_3$ is called to load a request for the extinguishment of a KP-FWD lamp at the position. This lamp is extinguished so that the operator may known that an outpulser has been seized. This request is loaded into the system, segment $Pa_3$ gives up control at time $T_6$ and takes a short real time break from time $T_6$ to $T_7$ when a signal is received indicating that the KP-FWD lamp has been extinguished.

Program segment $Pa_4$ is called at time $T_7$ and one of its functions is to initiate a scanning operation to detect the attachment of a sender to the call in the next office. The program segment completes its function and gives up control at time $T_8$ following which the program takes a long real time break while waiting for the return of the sender attach signal. The system has no way of knowing when the sender attached signal will be received. The signal may be received almost instantaneously, or following a wait of several seconds or even several minutes. It is therefore necessary that new call information including operator key action signals not be rehoppered for this duration. Therefore, the program takes a long real time break during which the PRB filter for the position is set to zero and during which the KST filter is set to a value "$i_1$" to indicate the current state of the call. This setting of the PRB and the KST filters permits newly received call signals to pass through the PRB filter to the KST filters which determine whether it is logical or illogical as already described.

The long real time break ends at time $T_9$ when a signal is received indicating the attachment of a sender in the next office. Program segment $Pa_5$ is called at this time to load a request for the outpulsing of the stored digits. This request is loaded, the program gives up control at time $T_{10}$, and takes a long real time break from time $T_{10}$ to $T_{11}$ during which the registered digits are outpulsed. The PRB filter is set to zero and KST filter is set to value "$i_2$" during this interval. A signal is received indicating the completion of outpulsing at time $T_{11}$ and program segment $Pa_6$ loads a request to release the outpulser. This segment gives up control at time $T_{12}$ and a short real time break exists from time $T_{12}$ to $T_{13}$ when a signal is received indicating that the outpulser has been released. Program segment $Pa_7$ loads a request to extinguish the ST lamp from times $T_{13}$ to $T_{14}$. The extinguishment of this lamp tells the operator that outpulsing has been successfully completed. Segment $Pa_7$ gives up control at time $T_{14}$ and a short real time break exists from time $T_{14}$ to $T_{15}$ when a signal is received indicating that the ST lamp has been extinguished. Segment $Pa_8$ is called at time $T_{15}$ to update memory to indicate that an outpulsing operation has successfully been completed. Program segment $Pa_8$ and the entirety of program $Pa$ gives up control at time $T_{16}$ following which the system may perform other useful work.

The preceding has described the operation of the system on the assumption that the outpulsing operation is successfully completed without interruption.

The middle horizontal line on FIG. 9B illustrates the operation of our system in the event that the outpulsing operation is aborted and not completed. It is assumed at time $T_{17}$ that a release forward (RLS-FWD) signal is received from the operator during the duration of the long real time break intermediate times $T_8$ and $T_9$ on the upper line. The depression of a RLS-FWD key by the operator and the receipt of this key signal requests that the forward connection should be released, possibly because the customer no longer desires to complete the call. In any event, it is obvious that it would be a senseless operation at this point to continue with the outpulsing operation. The KST filter system permits the RSL-FWD signal to pass therethrough under such conditions and activate the programs normally associated with the signal.

As shown on the second line, the receipt of the key signal at time $T_{17}$ activates program segment $Pb_1$ of program $Pb$ as the RLS-FWD signal is received and passed through the KST filter system. Among the functions of $Pb_1$ are to terminate the scanning for a sender attach signal and to load a request for the release of the outpulser. Segment $Pb_1$ completes these functions at time $T_{18}$ and the program then takes a short real time break from time $T_{18}$ to $T_{19}$. During this interval the PRB filter is set to "1" and the KST filter is set to "0." At time $T_{19}$, a signal is received indicating that the outpulser has been released and the program segment $Pb_2$ is called. Among its functions are to load a request for lighting the RSL-FWD lamp and to extinguish the ST lamp at the position. Segment $Pb_2$ completes its function at time $T_{20}$ and the program takes a short real time break from time $T_{20}$ to time $T_{21}$. A signal is received at time $T_{21}$ indicating that the requested lamp action has taken place and segment $Pb_3$ is called to complete the remainder of the functions for program $Pb$. These functions are completed at time $T_{22}$ with the PRB and KST filters being set to "0."

The foregoing has described how an outpulsing operation may be aborted in the event the operator presses the RLS-FWD key prior to the attachment of the sender. The following describes the sequences of actions occurring in the event that the key is depressed between times $T_{10}$ and $T_{11}$ either during or immediately after the outpulsing operation has been completed but before an indication of this fact has been returned to the controlling program $Pa$. The system operations resulting from the depression of the key at this time are shown at the bottom horizontal line in FIG. 9B. As indicated, the RLS-FWD key is depressed between time $T_{10}$ and $T_{11}$ as the program $Pa$ is in the middle of a long real time break. This signal passed through the PRB filter and the KST filter system which determines that the signal represents useful information. The signal therefore activates program segment $Pc_1$ of program $Pc$. The function of this segment is to load a request that the outpulsing be terminated and that the outpulser be released. This request is loaded by time $T_{24}$ and from time $T_{24}$ to $T_{25}$ the program takes a short real time break. At time $T_{25}$ a signal is received indicating that the requested action has been taken and program segment $Pc_2$ is called to load a request that the RLS-FWD lamp be lit and that the start ST lamp be extinguished. This request is loaded by time $T_{26}$ and the program then takes a short real time break until time $T_{27}$ when an indication is received that the requested lamp action has been completed. Program $Pc_3$ is then called to update memory and program $Pc$ gives up control at that time.

In connection with FIG. 5 it has been described how call information may be received from either the system report or the key scan hoppers, how this information may either pass through a PRB filter and be acted on or, alternatively, how it may be temporarily rehoppered, how the rehoppered information is subsequently unloaded and applied to the PRB filters from time to time and, finally, how the information that passes through the PRB filters may be analyzed by the KST filter system which discards it if it is illogical, or allows it to pass through to the base level programs if it is logical with respect to the state of the call to which it pertains. It has further been described in connection with FIG. 5 how the various hoppers are unloaded with preference being given to the report rebuffer hopper, the key scan rebuffer hopper, and the key scan hopper in that order.

Figure 10A:
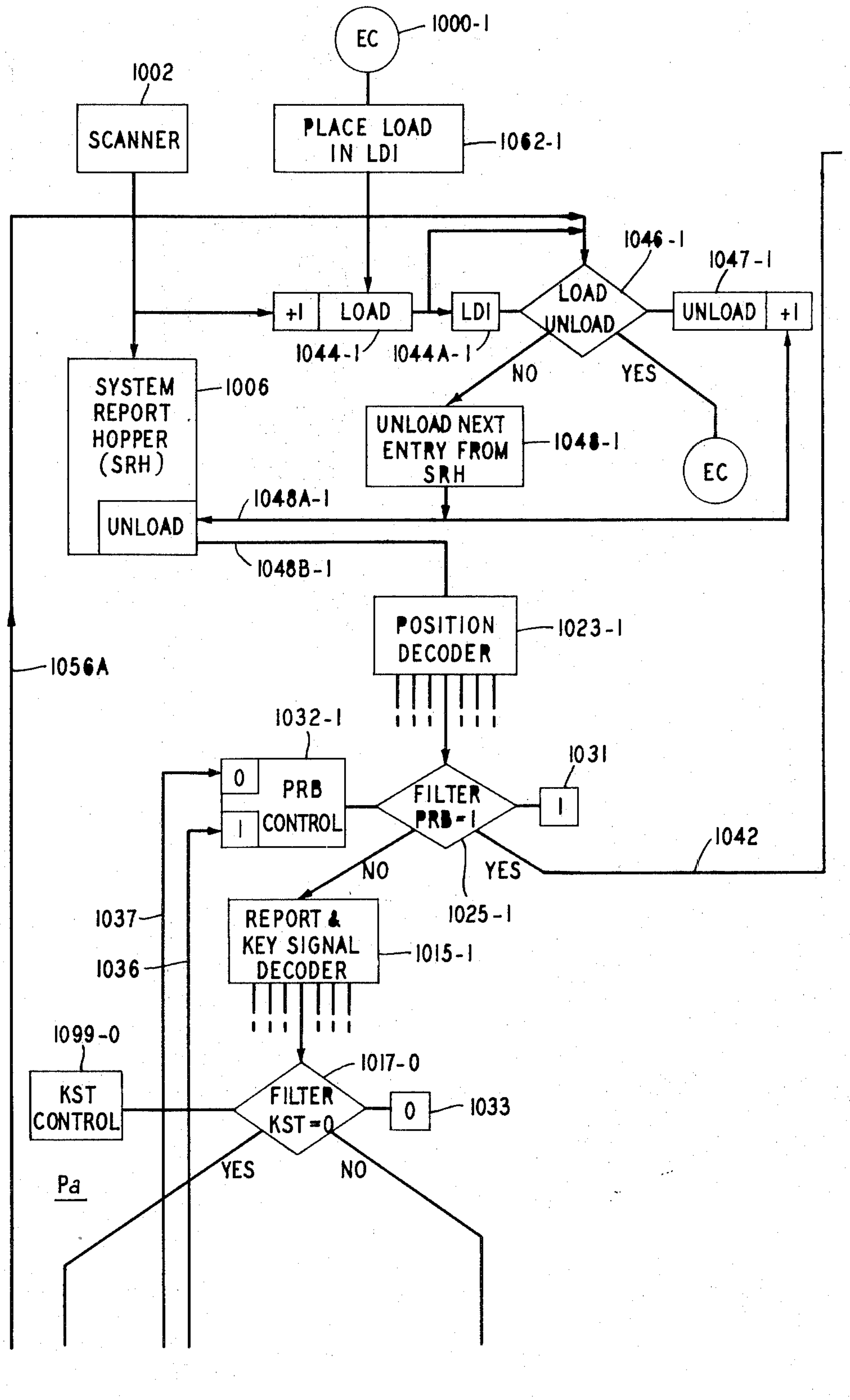
Figure 10B:
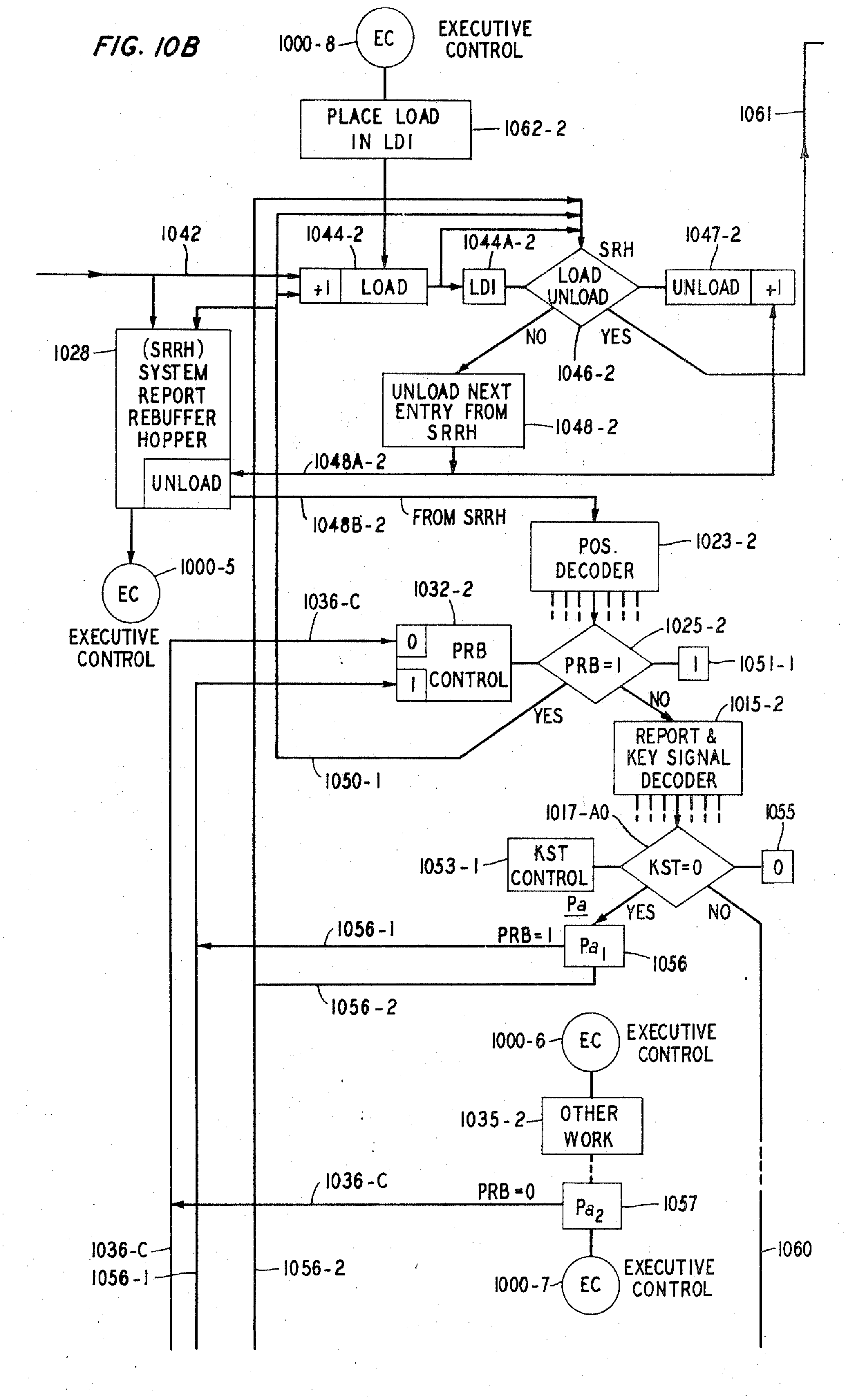
Figure 10C:
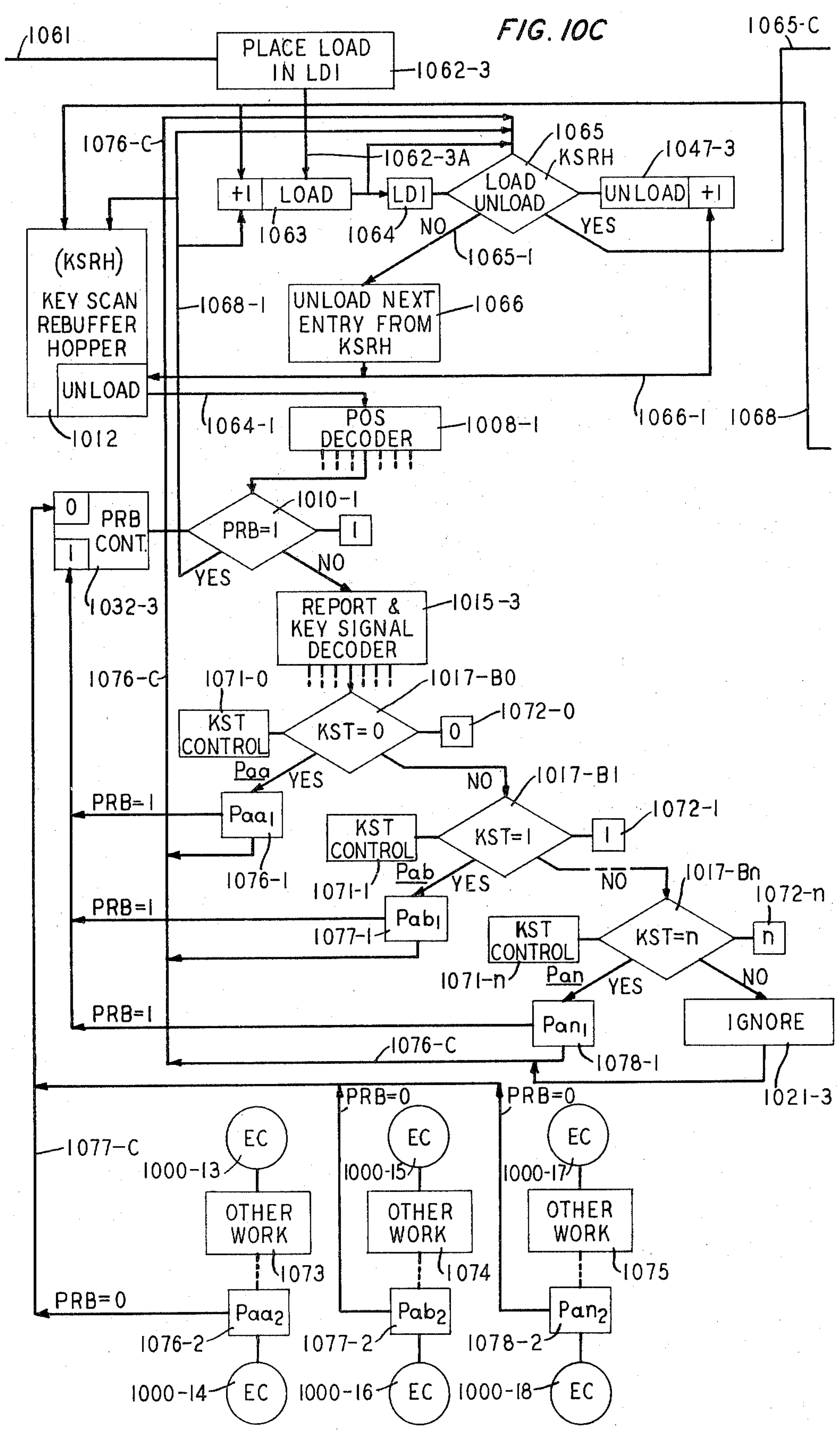
Figure 10D:
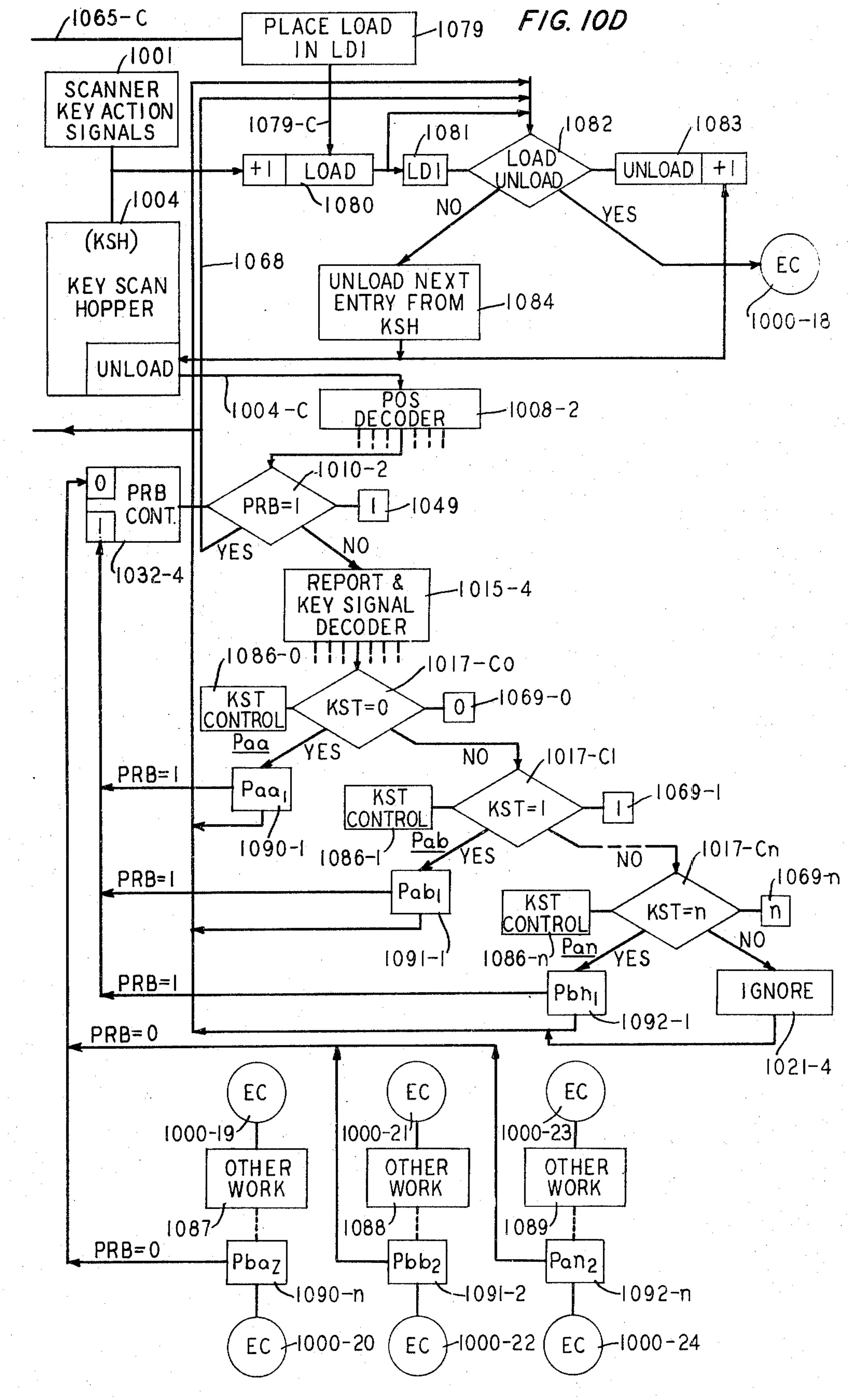
Figure 10E:
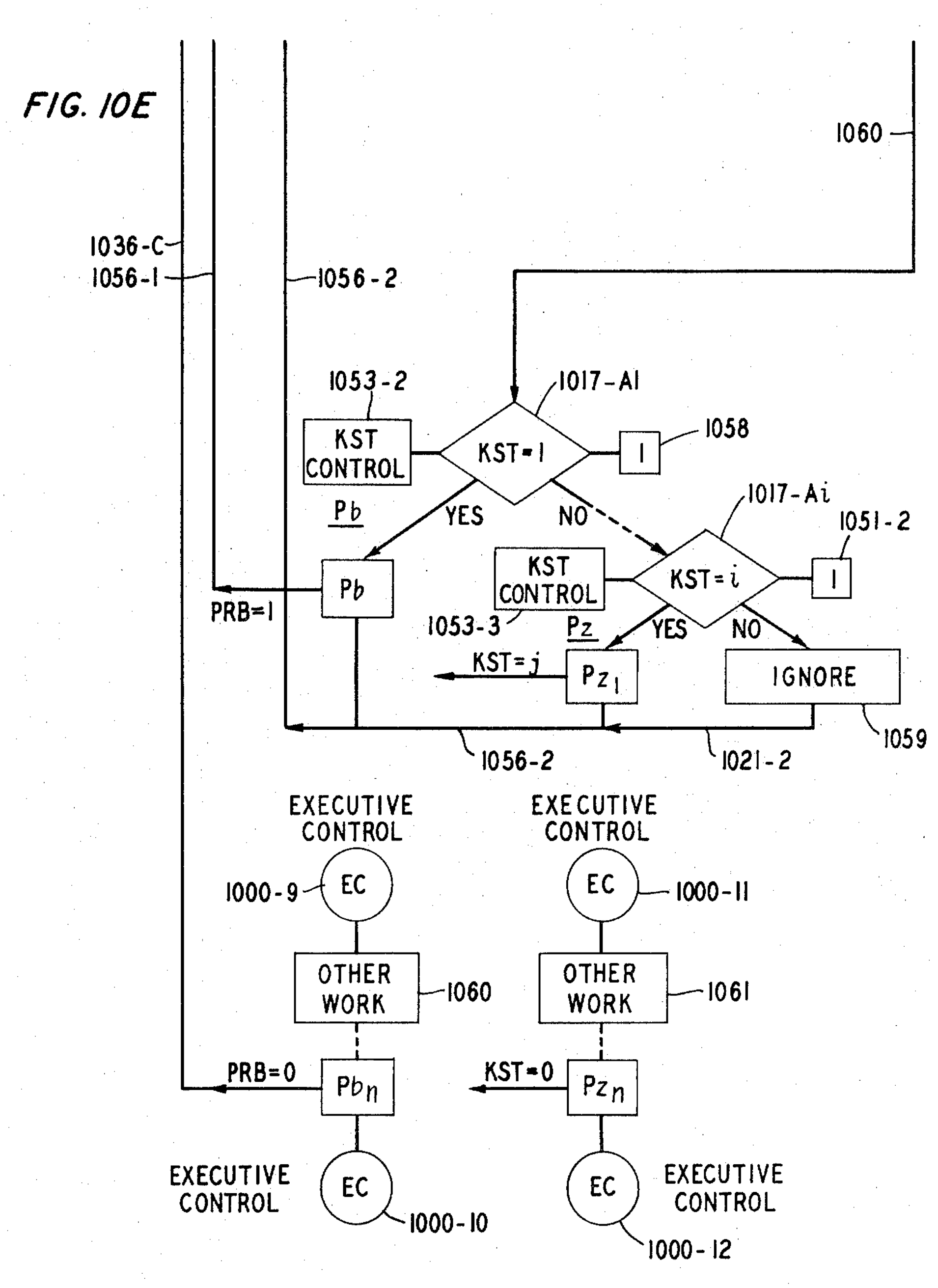
Figure 10G:
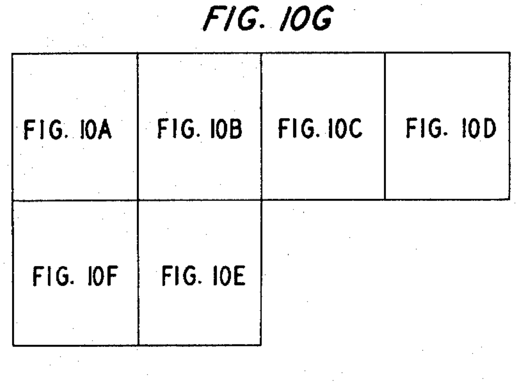
Figure 10F:
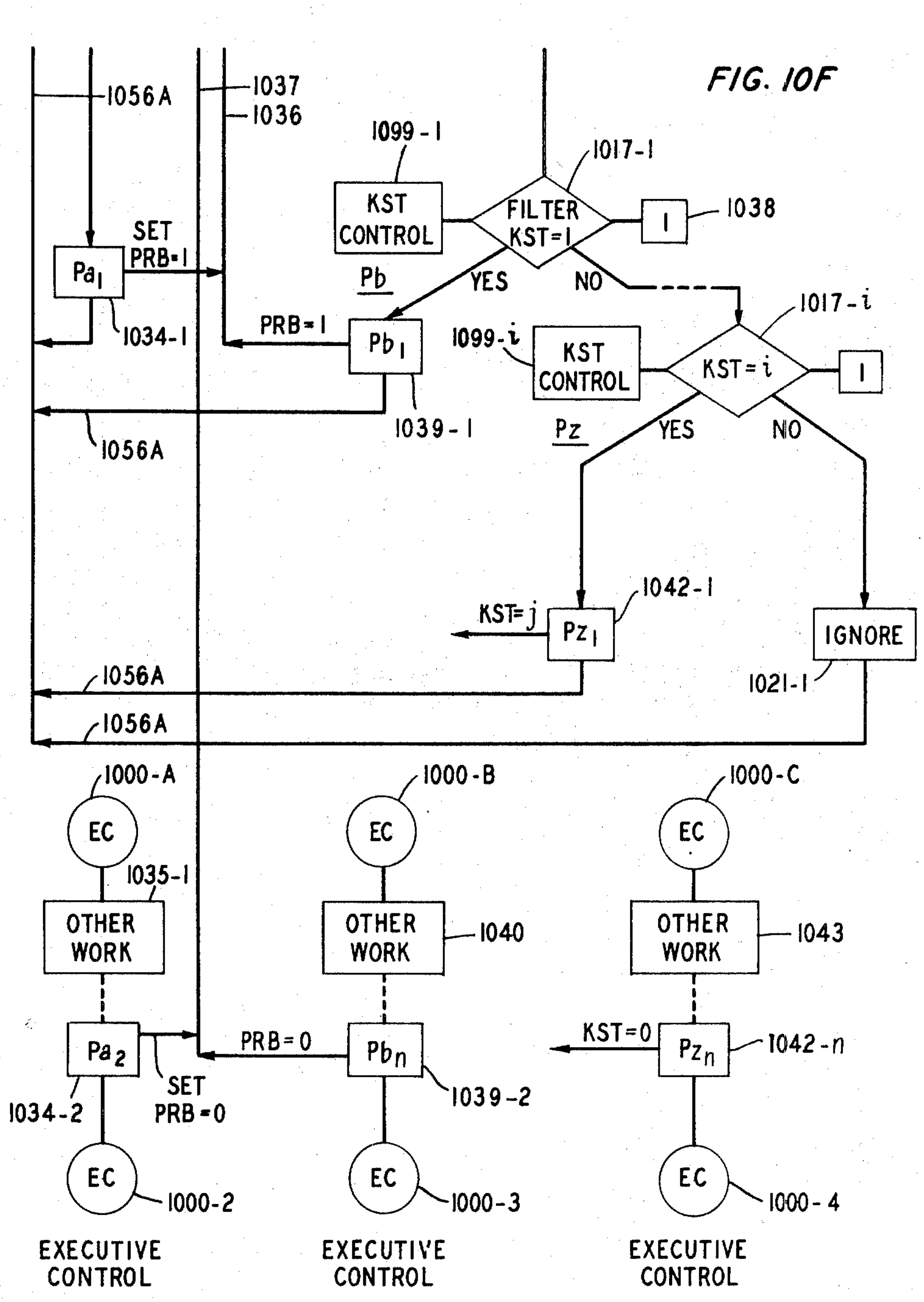

FIGS. 10A through 10E, when arranged as shown in FIG. 10G, illustrate the system of FIG. 5 in further detail. Specifically, FIGS. 10A through 10E disclose the manner in which received call information is processed and further disclose the manner in which the various hoppers are unloaded sequentially with first preference being given to the system report rebuffer hopper and last preference being given to the key scan hopper. The elements on FIGS. 10 that correspond directly to elements on FIG. 5 are designated, where possible, in a manner to indicate the correspondence. Thus, the system report hopper 506 on FIG. 5 is designated 1006 on FIG. 10A. In a similar manner, the last two digits of the designation of the other elements of FIGS. 10 are identical to the corresponding element on FIG. 5 where such correspondence exists. The executive control (EC), designated as element 500 in FIG. 5, has been subdivided into a plurality of elements on FIGS. 10 such as 1000-1, 1000-2, et cetera. The subdivision of the executive control into a plurality of elements simplifies the drawing by eliminating the need for the many interconnecting paths that would be required if only a single element was shown. Generally speaking, executive control may be considered to be a program or a group of programs whose function is to determine the order in which the processor performs its various tasks. With respect to the system of our invention, it determines the order in which the various received call signals are assimilated and utilized.

In order to describe the system of FIGS. 10 let it be assumed that the executive control 1000 determines that the hoppers should now be unloaded and that the system report hopper (SRH) 10006 on FIG. 10A should be unloaded first. The unloading of this hopper is controlled or initiated by executive control element 1000–1. In order to maintain the proper timewise relationship of the signals stored in the hopper, it is necessary that a "pointer" be provided for enabling the processor to determine the order in which the signals currently stored in the hopper should be unloaded. The load counter 1044–1, the LD1 counter 1044A–1, the unload counter 1047–1, and the comparison circuit 1046–1, are provided to assist the processor in unloading the signals from the SR11 hopper 1006 in the proper order. This is described in the following paragraph.

When a determination is made to unload the SRH hopper by executive control 1000–1, element 1062–1 designated "-Place Load in Load 1" applies a signal to counter 1044–1 which transfers its contents to element 1044A–1, LD1, and also applies a signal to element 1046–1 designated "load-unload." This element is connected on its left side to the counter 1044A–1 designated "LD1" and on its right side to the unload counter 1047–1. The load counter 1044–1 is incremented by "1" each time a new signal is stored in SRH hopper 1006 by the scanner 1002 while the unload counter 1047–1 is incremented by "1" each time a report is read out of the hopper. If the setting of the two counters are equal the hopper may be said to be empty and contains no information that should be read out. On the other hand if the setting of the load counter is higher than that of the unload counter the rebuffer hopper currently contains the number of words equal to the difference between the setting of the two counters that need to be unloaded. The contents of load counter are transferred at this time to LD1 so that element 1046–1 can determine when the unloading of the hopper is finished. When the setting of the LD1 and unload counters are equal, the SRH hopper has been unloaded and any signal then received at the upper input of element 1046–1 is passed therethrough and out over its "yes" conductor executive control which then performs other functions. If the setting of the LD1 counter is higher than that of the unload counter, the rebuffer hopper contains information that may be read out. In this case a signal at the upper input of comparison element 1046–1 is passed out over its "-no" conductor to element 1048–1 which controls the unloading of the next entry from the system report hopper (SRH). This signal is applied to the +1 input of the unload counter 1047–1 to increment it by 1 and is further applied to the unload circuitry of the SRH to unload the next entry from it. This entry is unloaded under control of the processor and applied out over conductor 1048B–1 to the input of position decoder 1023–1. This element determines the position serving the call to which the received report relates and passes it out over the one of its output conductors that is individual to the position. The position decoder has a plurality of output conductors each of which is associated with a different operator position and each of which is connected to a different PRB filter. Only one such filter is shown on FIG. 10A; it is designated as element 1025–1; and is connected to the middle output conductor of the decoder. It is to be understood that its other output conductors are associated with individual PRB filters which are not shown. The PRB filter is shown as a diamond shaped decision making element; on its stop corner it is connected to an output of the station decoder; it is also connected to an element 1031 which permanently stores the digit "1"; and it is connected to PRB control element 1032–1 which may be controlled to assume a value of either "0" or "1." The PRB filter further has an output designated "no" on its lower left-hand side, and output designated "yes" on its lower right-hand side. The PRB filter operates in such a manner that an item of information received at its input passes through the filter and out over its "no" conductor whenever the filter is open, i.e., in a "0" state. Alternatively, a received item of information is passed out over the "yes" conductor whenever the digit "1" is applied to the left side of the filter thereby indicating the closed state of the filter. For the time being, let it be assumed that the filter is currently in an open or "0" state, that the PRB control element 1032–1 is currently storing a "0" which is applied to the left corner of the PRB filter. This being the case, the information received from decoder 1023–1 passes through the filter, out over its "no" conductor, and is applied to the input of the report decoder 1015–1 which corresponds to element 515 on FIG. 5. This decoder analyzes the received call signal, determines the nature of the program action that would be normally activated in response to the receipt of a signal, and applies the signal out over an appropriate one of its output conductors. Each output conductor is associated with a different signal and each output conductor, in turn, is connected to an individual KST filter system of which only one is shown on FIG. 10A. The KST filter system shown generally as a single rectangle designated 517 on FIG. 5 actually comprises a series of filters each one of which is assigned a unique value and each of which compares the current state of a call with its assigned value in order to determine the disposition of any call applied to its input. Thus, KST filter 1017–1 receives a steady state value of "0" from element 1033 on its right-hand corner, and on its left-hand corner it receives information indicating the current state of the call from KST control 1032–1. This control element may assume any one of a plurality of values and each value is associated with a unique call state. If the current value stored in element 1032–1 is "0," the KST filter detects that a "0" is applied to both its right and left corners, and applies the call signal then received at its input out over its output conductor designated "yes" extending to segment $Pa_1$ of program P*a*. On the other hand, if KST control applies a digit other than "0" to the left side of KST filter 1017–0, the filter does not detect a comparison and the information then received at its input is applied out over its "no" conductor to the KST filter 1017–1 which is associated with a call state of "1."

The value of the digit stored in the KST control element 1032 is determined and controlled by the processor. Let it be assumed for the time being that KST control 1032–1 is currently set to the value of "0." This being the case, the call information received by the "0" stage of the KST filter 1017–0 is applied out over its "yes" output conductor to element 1034–1 which represents segment $Pa_1$ of program P*a*. The receipt of this information activates the program segment, places it in charge of the processor and the segment then performs whatever work functions are normally required of it. This may, for example, correspond to the program segment $Pa_1$ shown on FIG. 6. In response to the receipt of this information and the calling of the program, a signal is transmitted from the right-side element 1034–1 and applied over path 1036 to the "1" input of PRB control 1032–1 to set it to its "1" state in which it applies a steady state value of "1" to the left corner of PRB filter 1025. The receipt of this signal closes the filter so that any information subsequently received will be applied out over its "yes" conductor to the circuitry of FIG. 10B which is subsequently described.

Once it is activated, program segment $Pa_1$ performs its work functions and then gives up control of the processor by transmitting a signal over path 1056A extending to element 1046–1 which then initiates the unloading of the next entry from the SRH hopper as already described. This entry may or may not relate to the same call. Ultimately, control of the processor is returned to executive control element 1000–A which applies signal to element 1035 entitled "other work." This element corresponds to the interval between times $T_2$ and $T_3$ on FIG. 6. Program $Pa_1$ is said to take a short real time break during this interval and at this time the processor may perform other work as already described.

The processor activates program segment $Pa_2$ shown as element 1034–2 on FIG. 10A when it completes the other work 1035–1 and when the work requested by program segment $Pa_1$ has been completed and a signal to this effect returned to the processor. Program segment $Pa_2$ performs its functions, sets the PRB control element 1032–1 to a "0" state via path 1037 and then gives up control of the processor to executive control 1000–2. The setting of the PRB control to "0" opens the PRB filter 1025–1 so that the next signal received at its input will be extended through the filter and out over its "no" output conductor.

In the preceding example it was assumed that the KST filter 1017–0 was in a "0" state and that the information could pass therethrough, out over its "yes" conductor, to activate the program P*a* as described. In the event that the KST control element 1032–1 has been in any state other than "0," the KST filter would not have passed the signal out over its "yes" conductor and instead, would have detected that no comparison exists, and would have passed the signal over its "no" output conductor to KST filter 1017–1. This filter is controlled on its right side by element 1038 which stores a permanent value of "1" and on its left side by KST control 1032–2. As was the case for KST control 1032–1, element 1032–2 is controlled by the processor to store a digit representing the current state of the call to which the operator position associated with the filter is currently connected. Let it be assumed at this time that KST control element is in a "1" state. This being the case, a signal received at the input of filter 1017–1 will be extended out over its "yes" conductor to activate program P*b*having segments $Pb_1$ through $Pb_n$. The activation of program element $Pb_1$ sets PRB control to a "1" state. When its function is completed, segment $Pb_1$ via path 1056A initiates the unloading of the next entry from SRH as already described for segment $Pa_1$.

The activation of the lost segment of the program, $Pb_n$, sets the PRB control back to "0." Only the first and last sections of program P*b* are shown since the program may have as many sections as may be desired with the various sections being separated from each other by times during which the processor performs other work such as that shown for element 1040.

Figure 11:
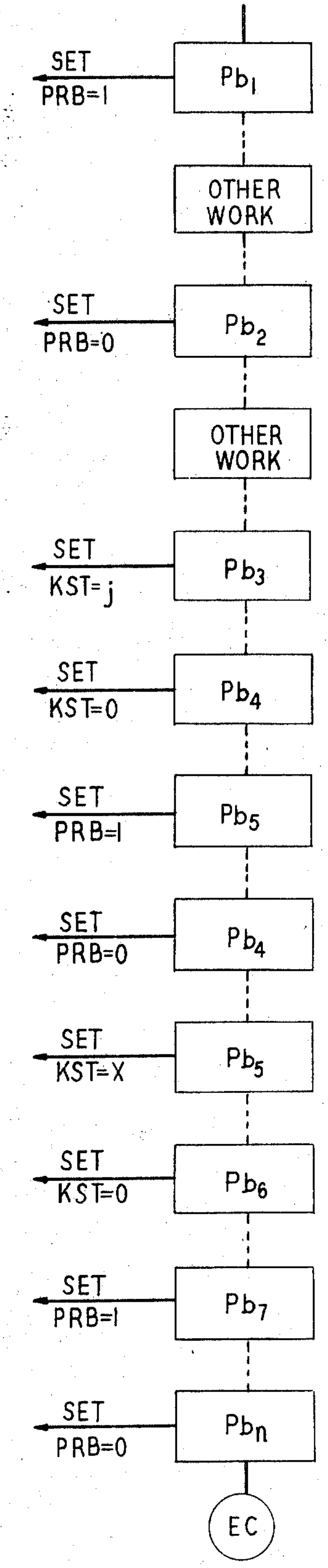

FIG. 11 shows in further detail the component parts that may comprise the program P*b* or any other segmented program shown on FIGS. 10. Specifically, on FIG. 11 program P*b* comprises element $Pb_1$, $Pb_2$ through $Pb_n$ each of which is separated from each other by times during which the processor performs other work. The first element sets the PRB filter to a "1" state to close the filter; the last element $Pb_n$ opens the filter by setting it to "0." The various other segments of the program may be separated from each other by either short or long real time breaks in the manner already described depending upon the work requested by the program element initiating the break. In our discussion of FIGS. 10 it should be appreciated that each program may comprise a plurality of parts the number of which will depend upon the work to be performed by the program. This is shown on FIG. 11. However, in order to simplify the understanding of the drawings most of the segmented programs in FIGS. 10 are shown to have only two segments, namely a first and a last.

The preceding assumed that the KST filter 1017–1 is in a "1" state when a signal is received and passed through the filter to activate program P*b*. If a comparison did not exist between the left and right corners of the filter, in other words, if KST control 1032–2 contains a digit other than "1," the filter would pass the received call signal out over its "no" conductor to the next stage of the KST filter system. There may be as many of these stages as may be desired and each will be similar to that shown in detail on the drawing. Specifically, the right-hand corner of the diamond representing the next filter stage will store a fixed value digit, the left-hand corner of the filter will be connected to a KST control element, and the filter will have a "yes" and a "no" output conductor. If the filter detects a comparison between the signal applied to its left and right inputs, it passes any signal received at this top input out over its "yes" conductor. Conversely, if the filter does not detect a comparison, it applies any received signal out over its "no" conductor. Thus, if the KST filter 1017–1 does not detect a comparison, the call signal it receives is applied out over its "no" conductor and is extended to the subsequent KST stage. This signal passes through all KST filters that are not in a comparison state until the signal is received by a filter that is in a comparison state. This filter applies the signal out over its "yes" conductor to activate the program associated with the conductor. Thus, if all of the KST FILTER elements, intermediate filters 1017–0 and **1017–*I*, are not in a comparison state, the signal will therethrough and be applied to the top of filter 1017–*I*. If it is in a comparison state, the signal is extended out over its "yes" conductor to activate program Pz having elements $Pz_1$ through $Pz_n$ separated by element 1043** during which other work is performed by the processor. The interval between elements $Pz_1$ and $Pz_n$ represents a long real time break since element $Pz_1$ sets the KST control to a value "*j*" before it gives up control. Element $Pz_n$ resets the KST filter system to a "0" state. The setting of KST filter to "*j*" will set the filter so that only a certain limited number of work requests will be honored or acknowledged during the long real time break of program Pz. With the KST filters for the call being set to a value "*j*," only the KST filter that receives a "*j*" on its right side will be in a comparison stage. The prior filters will be in a noncomparison stage and will pass each signal received out over their "no" conductor to the next stage so that when the signal is received by the "*j*" filter, it passes the signal out over its "yes" conductor to activate the program associated with the conductor.

If the "*i*" filter **1017–*i* is not in a comparison statewhen it received a signal, i.e., KST control 1032–3** is not set to "*i*," the signal is applied over the "NO" conductor of the "*i*" filter to ignore element 1021–1 which applies a signal to path 1065A to unload the next entry form the SRH hopper.

It should be emphasized at this point, that the report and key signal decoder 1015–1 has a plurality of output conductors and that each output conductor has associated with it a unique pattern of KST filters. For the specific pattern of KST filters shown on FIGS. 10A, an input signal will be disregarded whenever all of the filters "0" through "*i*" are set to a noncomparison state. During such times, a received call signal passes through each filter and out of its "no" output conductor and is finally received by the ignore element 1021–1. Conversely, a received signal will not be ignored whenever any of the KST filters are set to a comparison state. Thus, if the "0" filter is set to a comparison state program, P*a* is activated, if the "1" filter is set to a comparison state, program P*b* is activated; if the "*i*" filter is set to a comparison state, program Pz is activated. The patterns of KST filtering for the other outputs of the decoder may vary considerably from that shown for the middle conductor. A KST filtering pattern for only other output conductor may contain more or it may contain a lesser number of filtering stages. The report and key signal decoder operation in such a manner that it analyzes each received signal, determines the pattern of KST filtering to which the signal would be subjected, and then steers the signal out over the one of its output conductors that is connected to the required pattern of KST filtering.

The preceding has described how a system report is processed if the PRB filter for a call is open when the report for the same call is unloaded. On FIG. 5 this involves the detection by scanner 502 of the signals originating the report, the processing of the signals, the storage of the resulting intelligence they represent in system report hopper 506, the unloading of the hopper, the passage of the signal through position decoder 523, the passage of the signal through PRB filter 525 and the signal decoder 515 to the pattern of KST filtering associated with the decoder output conductor to which the signal is applied.

The following describes the manner in which a signal is rehoppered in SRRH hopper 528 if a PRB filter for the call is closed when the signal is unloaded from the system report hopper (SRH) 506. With reference to FIG. 10A, the signal is unloaded from the SRH hopper 1006, it passes through the position decoder 1023–1 and is applied to the PRB filter associated with the position currently serving the call to which the signal relates. The PRB filter 1025–1 is assumed to be related to this signal and is also assumed to be in a closed or "1" state at this time. Therefore the received signal is applied by the filter out over its "yes" conductor 1042 where on FIG. 10B it is loaded in the SRRH hopper 1028. The signal is further applied to the +1 input of counter 1044, designated load, to increment its setting by a count of one. After the signal is applied to path 1042 and is loaded into the SRRH hopper 1028, the control of the processor is returned to executive control 1000–5. The processor may then perform any other work whatsoever including unloading the next signal stored in SRH hopper 1006.

On FIG. 10B, the load counter 1044–2, the LD1 counter 1044A–2, the unload counter 1047–2 and the comparison circuit 1046–2 are provided to assist the processor in unloading the signals from the SRRH hopper 1025 in the proper order. When a determination is made to unload the SRRH hopper by executive control 1000–8, element 1062–2 designated "Place Load in Load 1" applies a signal to counter 1044 which transfers its contents to element LD1 and applies a signal to element 1046 designated Load-Unlaod. Element 1046–2 is connected on its left side to the counter 1044–2 designated LD1 and on its right side to the unload counter 1047–2.

The load counter is incremented by "1" each time a new signal is stored in the rebuffer hopper while the unload counter 1047–2 is incremented by "1" each time a report is read out of the hopper. If the setting of the two counters are equal the SRRH hopper may be said to be empty and contains no information that should be read out. On the other hand, if the setting of the load counter is higher than that of the unload counter, the SRRH hopper currently contains a number of words equal to the difference between the setting of the two counters. When the setting of the LD1 and unload counters are equal, any signal then received at the upper input of element 1046–2 is passed therethrough and out over its "yes" conductor to the circuitry of FIG. 10C whose function is subsequently described. If the setting of the LD1 element is higher than that of the unload counter, the SRRH hopper contains information that may be read out. In this case, a signal at the upper input of comparison element 1046–2 is passed out over its "no" conductor to element 1048–2 which controls the unloading of the next entry from the SRRH hopper. This signal is applied to the +1 input of the unload counter to increment it by 1 and is further applied over path 1048A–2 to the unload circuitry of the SRRH to unload the next entry from it.

This entry is unloaded under control of the processor and applied out over path 1048B–2 to the input of position decoder 1049. The position decoder determines the position to which the report relates and steers the report out over the output conductor to the PRB filter associated with the position. The PRB filter operates in a manner similar to that already described for the PRB filter of FIG. 10A. In other words, it receives a steady state value of "1" from element 1051–1 and it receives either a value of "0" or "1" from PRB control 1032–2. Whenever the filter detects a comparison, when it receives a "1" on both its left and right sides, it is said to be closed and it passes any signal it receives out over its "yes" output conductor 1050–1. If the filter does not detect a comparison, it is said to be opened and any signal it receives is passed over its "no" output conductor and applied to report decoder 1015–2. The decoder and the elements shown immediately therebelow on FIGS. 10B and 10E are similar to that described in FIG. 10A and therefore only details pertaining to the differences of the processing arrangement on the two figures need be described.

Let it first be assumed the PRB filter 1025–2 is open and that therefore the report decoder 1015–2 receives the signal, that is unloaded signal from the SRRH. This being the case the signal is applied from the decoder to the first KST filter 1017–AO which applies it out or over either its "yes" or its "-no" output conductor under the joint control of elements 1053–1 and 1055. If the report is extended over its "yes" conductor, it activates program segment $Pa_1$ of program P*a*. This segment completes its function which includes the setting of the PRB control to "1." Segment $Pa_1$ then gives up control and applies a signal to this effect over path 1056–2 which extends to the upper input of the load-unload element 1046–2 on the top of FIG. 10B. The receipt of this signal by element 1042–2 activates the unloading of the next entry from the SRRH. Control of the processor returns to executive control 1000–6 ultimately after the unloading of the hoppers is completed. EC 1000–6 then passes control to element 1035'2 which performs the tasks requested by segment $Pa_1$ and also performs other work for other calls. Element 1035–2 next activates segment $Pc_2$ which completes its function, sets PRB equal to "0" over path 1036–C and then gives up control to executive control 1000–7.

In the event that PRB filter 1025–2 has been set to a "1," a closed state, the report would be extended out over its "yes" conductor 1050–1. This conductor extends to the input of the SRRH hopper 1028, to the +1 input of the load counter, and to the upper input of the load-unload comparison element 1046–2. Thus, the report applied to "yes" conductor 1050–1 is reloaded into hopper 1025, it causes the load counter to be incremented by "1," and it causes the next entry in the SRRH opper to be unloaded.

All signals received by the KST filter 1054–0 when it does not detect a comparison, in other words, whenever the KST control element 1053–1 is not set to "0," are applied out over its "no" output conductor 1060 to the KST filter element 1017–A1 on FIG. 10E. The arrangement of FIG. 10E is similar to that already described for FIG. 10A and therefore only brief mention need be made of it. Generally speaking, a signal received by the "1" stage of the KST filter is applied out over its "yes" conductor to activate program P*b* whenever the filter receives a "1" from KST control 1053–2. Program P*b* contains element $Pb_1$ which sets the PRB filter to "1," takes a short real time break and gives up control while at the same time initiating the unloading of the next entry in the SRRH hopper over conductor 1056–2. Executive control 1000–9 subsequently initiates other work element 1060, which, when it is completed returns control of the program to its segment P*bn* which resets the PRB filter to "0" and returns control to executive control 1000–10.

It should be noted that the KST filter arrangement and the programs activated by the KST filters of FIG. 10A are identical to that of FIGS. 10B and 10C Thus, the "0" filter on FIG. 10A, element 1017–0, activates program P*a* if it detects a comparison. The corresponding filter on FIG. 10B, element 1017–A0, also activates program P*a* when it detects a comparison as a signal is received. The same correspondence exists between the other stages of the filters of FIG. 10A and FIGS. 10B and 10C.

The reason for this correspondence is that any given system report should receive the same pattern of KST filtering regardless of whether it is unloaded from the SRH hopper and processed by the filters of FIG. 10A; or whether, after being entered into the SRRH hopper because PRB filter 1025–1 is closed, it is processed by the filters of FIGS. 10B and 10C after being unloaded from hopper SRRH. Thus, the "0" stage of each of these filter systems activates program Pa, the "1" stage activates program P*b*, et cetera. By this means, any report receives the same treatment from each of the same filtering systems.

The program P*z* is activated whenever the "*i*" stage of the KST filter receives an input signal while KST control is set to the value "*i*." The first segment of program P*z* sets the KST filter to "*j*," takes a long real time break, and completes its work with segment $Pe_n$ which resets the KST filter to "0." Each report that is received by the "i" stage of the KST filter is ignored if the filter does not receive an "i" at the time from KST control 1053–3. In this case, the report is passed out over the "no" output conductor to the ignore element 1021–2 aplies a signal to path 1056–2 to unload the next entry from the SRRH hopper.

The preceding has described how the report rebuffer hopper 528 is unloaded as a matter of first priority. The key scan rebuffer (KSRH) hopper 512 is unloaded as a matter of second priority. The manner in which the KSRH hopper is unloaded is described in detail with respect to FIGS. 10 in the following paragraphs.

The LD1 and Unload counters on FIG. 10B have identical settings when the unloading of the SRRH Hopper is completed, the Load-unload element 1046–2 detects the comparison and applies the next received signal out over its "yes" conductor extending to element 1062–3 on FIG. 10C designated Place-Load-in Load 1. The signal received by this element is extended over its output conductor 1062–3A extending to the upper input of the load counter 1063. The receipt of this signal transfers the current contents of the Load counter to the LD1 counter 1064. The output of the Load counter at this time also applies a signal to the upper input of the Load-unload element 1065. The setting of the LD1 counter will normally be higher than that of the unload counter 1047–3 whenever the Key Scan Rebuffer Hopper contains entries that are to be unloaded. Therefore, assuming this to be the case, the Load-Unload element does not now detect a comparison and applies signal out over its "no" conductor to element 1066 entitled Unload Next Entry From KSRH. This circuit in turn applies a signal over its output conductor to the Unload counter 1047–3 to increment it by "1." This signal also is applied to the unload input of the KSRH 1012 to unload the next entry from it. This entry is unloaded and applied over its output conductor 1064–1 to the Position Decoder 1008–1 which, in turn, extends it out over the appropriate one of its output conductors to the PRB filter 1010–1 associated with the position serving the call to which the report relates. If the PRB filter is closed by virtue of being set to "1," the report is applied over "yes" path 1068–1 to the input of the KRSH where it is rehoppered. This path also extends to the +1 input of the load counter 1063 and to the upper input of Load-unload element 1065. Therefore, the signal on this path increments the load counter by "1" and initiates the unloading of the next entry from the KSRH.

If PRB control 1032–3 is not set to "1," the PRB filter 1010–1 does not detect a comparison, and it applies the input signal it receives over its "no" conductor to the Report and Key Signal Decoder 1015–3. This element has an input conductor individual to each possible report and key signal with each conductor being connected to an individual series of KST filters. Only the filters connected to the middle output conductor are shown. The operation of the KST filtering system of FIG. 10C is similar in most respects to that already described for the KST filtering system of FIGS. 10A, 10B and 10E. Thus, only a few brief comments concerning the differences of the system of FIG. 10C are needed at this point. Program P*aa* is activated when KST filter 1017–B0 is in a "yes" condition as it receives a signal. Similarly, programs P*ab* and P*an* are activated by the "yes" conditions of KST filters 1017–B1 and 1017–B*n* when they receive an input signal, respectively. A signal is disregarded if it is received at a time when the KST filters are set to a value higher than *n*. Thus at such times, any signal applied from the decoder 1015–3 is extended through each filter and out over its "no" output conductor to the next filter until it is received by ignore element 1021–3 which applied a signal to path 1076–C to unload the next entry from the KSRH hopper.

Program P*aa* includes segment $Paa_1$ and $Paa_2$ which are separate timewise from each other by executive control 1000–13 and other work 1073. Similarly program P*ab* and P*an* are segmented as indicated and separated from each other timewise in the manner indicated on FIG. 10C. The program segments $Paa_1$, $Pab_1$ and $Pan_1$ each set the PRB filter to "1" via the PRB control 1032–3 and each further transmits a signal to the Load-Unlaod element 1065 via path 1076–C to initiate the unloading of the next entry from the KSRH hopper. The last segment of each of these three programs also resets the PRB filter to "0" via PRB control and path 1077–C.

The unloading of the KSRH continues until the Load-Unload element 1065 determines that the count in the Unload counter 1047–3 equals that in the LD1 counter 1064. At that time, the next signal received by the upper input of the Load-Unload element 1065 is applied over its "yes" conductor 1065–C which extends to the element 1079 on FIG. 10D designated Place Load in Load 1. In the same manner as already described for FIG. 10C, this element receives the input signal and, in turn, over its output conductor 1079–C, applies a signal to the Load counter 1080 which transfers its contents to the LD1 counter 1081. At the same time, a signal is applied from the output of the Load counter 1080 to the Load-Unload element 1082 which initiates the unloading of the KSH hopper. The signals that are unloaded from this hopper are transmitted via path 1004–C to the Position Decoder 1008–2 which applies them over an appropriate one of its output conductors to the PRB filter associated with the position to which the call is connected. The primary difference between the operation of the circuit of FIG. 10D and the FIG. 10C is that on FIG. 10D a signal that is transmitted from the Position Decoder to a PRB filter in a "1" state is not unloaded into the KSH hopper but, instead, is applied out over the "yes" conductor of the PRB filter to conductor 1068 extending to the +1 input of Load counter 1063 and to the input of the KSRH hopper of FIG. 10C where the signal is loaded in that hopper and increments the setting of counter 1063 by one. Conductor 1068 also extends to the upper input of the Load-Unload element 1082 to initiate the unloading of the next entry from the KSH hopper.

From the above, it may be seen that each entry that is unloaded from the KSH hopper when the PRB filter is in a "0" state will pass through the filter the Report and Key Signal Decoder 1015–4 and be applied to the KST filter system for analysis to determine whether the signal should be permitted to activate a program or alternatively whether it should be disregarded. On the other hands, each signal that is unloaded from the Key Scan Hopper when the PRB filter is in a "1" state will be applied out over the "yes" conductor of the filter and loaded into the KSRH.

As already described for the system reports, the KST filters of FIGS. 10C and 10D provide for the same treatment of any given key signal regardless of whether it is processed after being unloaded from the KSH hopper or alternatively whether it is loaded into the KSRH hopper and later unloaded. Thus the "0" stage of each filter system of FIGS. 10C and 10D activates program P*ab*, the "1" stage activates program P*aa*, etc. This expedient provides for the same treatment for a signal regardless of which hopper it may be in at the time it is unloaded and analyzed by the system.

It should be appreciated at this point that various elements on the drawing have been shown segmented from each other and as separate elements in order to minimize the drawing complexity. Thus, a plurality of PRB control elements are shown, namely 1032–1 on FIG. 10A, 1032–2 on FIG. 10B, 1032–3 on FIG. 10C, and 1032–4 on FIG. 10D. In actuality, all PRB filters for a position can be controlled by a single PRB control element. However, a plurality of such elements rather than only a single one is shown in order to minimize the number of interconnecting wires extending between the various drawing figs. In a similar manner, a plurality of KST control elements are shown with each being associated with a different KST filter. In actuality, only a single KST control element need be provided for all of the KST filters associated with the particular operator position. A plurality of such elements rather than a single one are shown in order to minimize their complexity. It should further be appreciated that since only a single PRB control element and a single KST control element need be provided, that all the PRB control elements shown on the drawing operate in unison so that all PRB filters for a position are set to the same value. In other words, a signal that is received by one of the PRB control elements on FIG. 10A for example, to switch it from a value of "0" to "1" is also assumed to cause the PRB control elements on the other Figs. to switch in a same manner. Similarly, the KST control elements all work in unison in response to the receipt of an input signal any one of them so that all KST filters on FIGS. 10 and associated with a particular operator position are set to the same value.

The hopper unloading operation initiated by executive control element 1000–8 on FIG. 10B terminates when the setting of counter LD1–1081 on FIG. 10D equals that of the Unload counter-1083. At that time, the next signal received by Load-Unload element 1082 is extended over its "yes" conductor to executive control element 1000–18 which in turn returns control of the processor to the next item of work to be performed. The next item may be a return of an "otherwork" element on FIGS. 10 and then on to the next segment of an activated report of key signal program. Alternatively, the next item may be any other system function whatsoever that may or may not pertain to the processing of out system reports or key signals.

In summary, it may be seen that out invention provides a new and novel arrangement whereby call information having varying degrees of significance may be received from a plurality of sources in an ordered manner. The received information is processed to determine whether it represents useless information or alternatively whether it represents information of significance and relevance to the current state of the call. If relevant, it is utilized and if not, it is disregarded Our invention further provided an arrangement whereby information that is received when the processor is already actively engaged in a work function for the same call, i.e., during a short real time program break, is temporarily rehoppered and then subsequently unloaded when the processor is free to perform additional work for the same call. In this manner, our invention permits a processor control led system to receive information from various sources and of varying significance in such a manner that the real time capabilities of the processor are not wasted or degraded.

The following described in further detail certain elements shown on the drawing namely, the hoppers, the PRB filters, the KST filters, the position decoder and the report and key signal decoder.

Each hopper comprises a portion of memory which receives and temporarily stores various items of information. The key scan hopper and the key scan rebuffer hopper receive and store signals representing operator position key depressions. Similarly, the report hopper and the report rebuffer hopper receive and temporarily store system report signals. The entering of signals into a hopper and the unloading of the signals from a hopper may be performed by utilizing well-known programming techniques pertaining to the packing and unpacking of listed information. Since such details comprise no portion of our invention, the specific manner in which a hopper may be loaded or unloaded is not disclosed herein.

The PRB filter actually comprises a program and processor function. When a signal is unloaded from a hopper and entered into a processor index register, the processor first determines whether a short real time break is currently in existence for the call and then enters the index register contents into a rebuffer hopper if a short real time break currently does exist or, alternatively, performs the report and key signal decoder function if a short real time break does not exist. The system memory is subdivided so that there is a section of memory individual to each call served by an operator position. Each such section is termed a position register and in it the processor enters various types of call status information so that the current state of each call may readily be determined by analyzing the contents of its position register. The PRB and KST information is included in that which is entered into the position register for each call. Whenever the processor receives an unloaded call signal from a hopper and enters it into one of its index registers, it reads the contents of the position register for the call to determine the PRB and KST information. If the PRB bit is "1," indicating a short real time break, the PRB filter is said to be closed and the call signal is transferred from the index register to a rebuffer hopper. If the PRB bit is "0," the signal remains in the index register for further processing as the processor performs the call signal decoding and KST filtering functions.

The position decoder merely comprises a decoding function in which the processor (1) examines the data bits representing the position that originated each received call signal, and (2) utilizes these bits to determine which position register should be read to extract the call status information including the PRB and the KST information. Each received key signal includes bits specifying the position at which the signal originated.

The report and key signal decoder also comprises a translation function in which the processor examines the data bits indicating which key has been depressed, or which report signal has been received and, in response thereto, determines the pattern of KST filtering to which the call signal should be subjected. Recorded in memory is information specifying the pattern of KST filtering that is to be used in connection with the reception of each possible key signal or each possible system report. The report and key signal decoder and the KST filters work in conjunction with one another so that the system may respond to two variable parameters. The first variable is the report or key signal that is received; the second variable is the state of the call at the time the report or key signal is received, i.e., the KST information. With respect to FIG. 10A, the reception of the indicated report at a time the KST bit for the call is a zero requires the calling of program Pa. The reception of a different report at a time the KST state for its call is "0" may require the calling of a program other than P*a*, such as for example, P*b* or any other program. Thus, the report and key signal decoder together with the KST filters constitutes information stored in memory specifying the system response for all possible conditions, including all possible call states the system may be in for any type of signal that may be received.

The PRB and KST information is generated by a program segment about to give up control, and this information is stored in the position register for the call to which the program pertains. Thus, with reference to FIG. 6, program segment $Pa_1$ generates a PRB bit of "1" as a part of its overall functions. This PRB bit is entered by a "processor to memory" write operation into the appropriate position register. Similarly, one of the many functions of the program segment $Pa_2$ on FIG. 6 is to change the state of the PRB bit from "1" to "0." Segment $Pa_2$ does this prior to giving up control and in a similar manner the new PRB bit of "0" is written in the appropriate position register. In other words, each program segment performs a plurality of functions and included in the functions for each segment is the task of writing the proper PRB or KST information in the position register pertaining to the call being served by the program.

The foregoing has not illustrated in detail the manner in which (1) information is retrieved from memory and entered into an index register, (2) information is transferred from an index register to an appropriate spot in memory, and (3) a memory to memory transfer is effected via the processor and an index register. Also there is no disclosure herein on any details of the coding that might be required to effect any of the foregoing described operations.

Details of the type mentioned in the preceding paragraph are not disclosed in this application since they comprise no portion of our invention. Specifically, our invention may be practiced with any suitable real time processor operating on a time shared basis. The specific processor used and the particular coding that is used with the processor is totally irrelevant insofar as concerns an understanding of out invention. Thus, there are many expedients and techniques in the program art for entering information into and retrieving information from memory, as well as transferring information between memory. Some of the expedients and techniques are more efficient than are others. Our invention and its understanding is completely independent of the specific processor selected or the efficiency of the coding and programming techniques used. Although the resultant operability of a system embodying out invention does not depend upon the efficiency of the selected coding techniques, the efficiency of operation of the system would obviously be dependent upon the efficiency of the coding.

The following described and defines some of the more common data processing terms that are used in the specification.

Queue

An ordered sequence of data or information words in memory which represent system work requests or tasks. The words or data are placed in the queue while waiting for a facility and they are most commonly served on a first come, first served basis.

Buffer

A temporary memory area which provides an intermediary storage between two storage or data handling systems whose access times or formats are different. The buffer usually serves as an intermediary between an input or output device and the main or internal high speed portions of the processor.

Hopper

An area of memory used to accumulate input data from peripheral equipment. The data is normally unloaded on a first in, first out basis.

As can be seen, the definitions have definite similarities and, in fact, overlap to a degree. The main differences reside in subtle connotations that those skilled in the art associate with the three terms. Queue is the most generic term, and fits the other two in the general sense. However, a queue is regarded as a place where a work request waits for a facility (or facilities) when the reason for not serving the work request initially was due to the fact that the required facility was unavailable.

The main characteristic which dictates use of the term buffer is the idea of time or speed differential. That is, for example, where data or orders, etc., are generated at processor speed but must be executed at peripheral unit speed.

Generally speaking the definition of a hopper fits that of a buffer (or conversely). However, the term hopper is appropriate where the transfer of data between programs through temporary storage is by choice because of expediency or efficiency gained in processing and not due to lack of facilities or a timing problem. For example, the machine may be constrained to look for data at rates which are dictated by a requirement that loss of data must be negligible. However, once having received the data, it is hoppered if it is more efficient to store it and work on it later than it is to process it immediately. Also, and very important, the word hopper implies an area of memory set aside for the purpose of storing data that is subsequently unloaded in the same sequence in which it was loaded. However, there may be external constraints which prohibit the unloaded data from being processed in the same order as it was received. In this case, the data is rehoppered for later processing. In other words the order of processing for data in a hopper is not as rigid as it normally is with a queue.

A filter (such as the PRB or KST filters) is a filtering, gating or steering arrangement for data representing work requests unloaded from the hoppers. Each data word received by a filter is filtered, gated or steered to one of a plurality of outputs of the filter in accordance with the current state of the filter. Each state is unique to a different output and the filter state is controlled by the system in accordance with the current status of the call.

What is claimed is:

In a stored program controlled telephone system in which work tasks are affected by time segmented programs with the interval between successive segments of a program comprising relatively short real time breaks of a predetermined finite duration and longer real time breaks of an indefinite duration, operator positions means at each position for generating key signals representing requested work tasks for calls served by said positions, means for receiving said key signals, means responsive to reception of a first signal from a position during its serving of a call for activating a call serving program associated with said first signal, means for subsequently analyzing each received signal from the position serving said call to determine whether it represents a logical or illogical service request with respect to said call, and means responsive to the subsequent reception of each signal for said call for the duration of said activated program for disregarding any signal representing an illogical request.

2. The system of claim 1 in combination with means effective during a short real time break of said activated program for temporarily storing all newly received signals for said call, means subsequently effective during a longer real time break of said activated program for applying each stored signal to said means for analyzing.

3. The system of claim 2 in combination with means responsive to a determination that a subsequently received signal represents a logical request for changing the state of the call by activating a call serving program associated with said last-named signal.

4. The system of claim 3 in combination with means subsequently effective upon the receipt of a call signal after said activated program for the same call has completed its final function and has given up control of said system for initiating the work task represented by said signal.

5. In a program controlled telephone system in which call serving work tasks are effected by time segmented programs with the interval between successive segments of a program comprising relatively short real time breaks of a predetermined finite duration and longer real time breaks of an indefinite duration, means for receiving call signals each of which represents a system work task, means effective during a short real time break of a priorly initiated program for a call for temporarily storing newly received signals for said call, means subsequently effective during a longer real time break of said priorly initiated program for analyzing said stored signals to determine whether each signal represents an illogical or a logical request, and means for disregarding a signal if it represents an illogical request.

6. The system of claim 5 in combination with means effective upon the receipt of a call signal when said system is not under control of a program for a call to which said signal pertains for initiating the work task represented by said signal.

7. The system of claim 5 in combination with means responsive to a determination that a signal represents a logical request for changing the state of the call by initiating the system work task associated therewith.

8. The invention of claim 5 in combination with operator positions, means for extending each call served by said system to any one of said positions, means at each position for generating signals representing requested work tasks for calls served by said positions, and means for transmitting each generated signal to said call signal receiving means.

9. In a program controlled switching system in which call serving work tasks are effected by time segmented programs with the interval between successive segments of a program comprising relatively short real time breaks of a predetermined finite duration and longer real time breaks of an indefinite duration, a fist hopper for receiving call signals each of which represents a system work task, means for periodically unloading said signals from said first hopper, a rebuffer hopper, means effective for transferring signals pertaining to a call from said first hopper to said rebuffer hopper whenever said signals are unloaded from said first hopper during a short real time break of a priorly initiated program for said call, means for analyzing call signals to determine whether each represents an illogical or a logical service request, means for applying to said analyzing means each signal pertaining to said call and unloaded from said first hopper during a longer real time break of a priorly initiated program for said call, means for periodically unloading call signals from said rebuffer hopper, and means effective for applying to said analyzing means each signal pertaining to said call and unloaded from said rebuffer hopper during a longer real time break of a priorly initiated program for said call, and means for disregarding a signal if it is determined by said analyzing means to represent an illogical service request.

10. The system of claim 9 in combination with means responsive to a determination that a signal received by said analyzing means represents a logical request for changing the state of said call by initiating the call serving work task associated with the received signal.

11. The invention of claim 10 in combination with means for reentering into said rebuffer hopper any signal unloaded therefrom during a short real time program break of the call to which said signal pertains.

12. The invention of claim 11 in combination with operation positions, means for extending each call served by said system to any one of said positions, means at each position for generating signals representing requested work tasks for calls served by said positions, and means for transmitting each generated signal to said first hopper.

13. In a program controlled switching system in which call serving work tasks are effected by time segmented programs with the interval between successive segments of a program comprising relatively short real time breaks of a predetermined finite duration and longer real time breaks of an indefinite duration, a first hopper for receiving call signals each of which represents a system work task, a rebuffer hopper, means effective during a short real time break of a priorly initiated program of a call for transferring signals pertaining to said call from said first hopper to said rebuffer hopper, means subsequently effective for periodically unloading said signals from said rebuffer hopper, means for analyzing call signals to determine whether each signal represents an illogical or a logical request, and means for disregarding an analyzed signal if is represents an illogical service request.

14. The system of claim 13 in combination with means responsive to a determination that an unloaded signal represents a logical request for changing the state of the call by initiating the call serving work task associated with said unloaded signal.

15. The invention of claim 13 in combination with means for reentering into said rubuffer hopper any signal unloaded therefrom during a short real time program break of the call to which said signal pertains, said last named means being also effective to prevent the application to said analyzing means of each signal that is reentered into said rebuffer hopper.

16. The invention of claim 15 wherein said unloading means includes means effective when a signal is unloaded from said rebuffer hopper during a longer real time program break of a call to which said unloaded signal pertains for applying said signal to said analyzing means.

17. The system of claim 16 in combination with means effective subsequent to the unloading of said rebuffer hopper for unloading said first hopper one call signal at a time during said long real time break, and means for applying each signal unloaded from said first hopper to said analyzing means to determine whether each unloaded signal represents an illogical or a logical service request for the call to which it pertains.

18 The system of claim 17 in combination with means responsive to a determination that an unloaded signal represents a logical request for changing the state of the call by activating a call serving program associated with said unloaded signal.

19. The invention of claim 13 in combination with operator positions, means for extending each call served by said system to any one of said positions, means at each position for generating signals representing requested work tasks for calls served by said positions, and means for transmitting each generated signal to said first hopper.

20. In a program controlled switching system in which call serving work tasks are effected by time segmented programs with the interval between successive segments of a program comprising relatively short real time breaks of a predetermined finite duration and longer real time breaks of an indefinite duration, a plurality of operator positions, means for selectively extending calls served by said system to any one of said positions, means at each of said positions for selectively generating different key signals each of which represents a work task to be performed for a call being served by the position at which the signal is generated, means for generating report signals pertaining to the status of calls currently served by said system, a first hopper for receiving key signals, a report hopper for receiving report signals, means for periodically unloading one signal at a time from said report hopper, means for unloading one signal at a time from said first hopper subsequent to the unloading of said report hopper, and means responsive to the unloading of each signal at times other than during a short or longer real time program break of a call to which said unloaded signal pertains for activating a call serving work task associated with said unloaded signal.

21. The system of claim 20 in combination with call state analyzing means, means including said analyzing means for analyzing each signal unloaded from said key signal and said report hoppers during a long real time break of a priorly initiated program for a call to which said signal relates to determine whether the unloaded signal represents an illogical or logical service request, and means for disregarding a signal if it represents an illogical service request.

22. The system of claim 21 in combination with means responsive to a determination that an unloaded signal represents a logical request for changing the state of the call by activating initiating a call serving work task associated with said unloaded signal.

23. The invention of claim 20 in combination with a key signal rebuffer hopper, means for entering into said key signal rebuffer hopper each signal unloaded from said first hopper during a short real time break of a priorly initiated program for a call to which said unloaded signal pertains, a report rebuffer hopper means for entering into said report rebuffer hopper any report signal unloaded from said report hopper during a short real time break of a priorly initiated program for a call to which said unloaded report signal pertains, means for periodically unloading said report rebuffer hopper one signal at a time, means effective subsequent to the unloading of said report rebuffer hopper for unloading said key signal rebuffer hopper one signal at a time, means effective for reentering into said rebuffer hoppers any signal unloaded therefrom during a short real time program break for the call to which said signal pertains, and means effective during a longer real time break of a priorly initiated program for a call for applying to said analyzing means each signal pertaining to said call and unloaded from any of said hoppers during said longer real time break to determine whether said unloaded signal represents an illogical or a logical service request.

24. The system of claim 23 in combination with means responsive to a determination that a signal represents a logical request for changing the state of the call by initiating a call serving work task associated with said unloaded signal.

25. The method of operating a telephone system comprising the steps of (1) receiving call signals each of which represents a requested call serving work task, (2) temporarily storing a newly received signal for a call if said system is currently performing a priorly requested work task for the same call, (3) subsequently analyzing each stored signal for said call prior to the completion of said priorly requested task to determine whether each represents an illogical or a logical service request, (4) disregarding a signal if it represents an illogical service request, and (5) changing the state of the call if a signal is determined to represent a logical request.

26. A method of operating a stored program controlled telephone system in which work tasks are effected by time segmented program with the interval between successive segments of a program comprising relatively short real time breaks of a predetermined finite duration and longer real time breaks of a indefinite duration, said method comprising the steps of (1) receiving key signals from operator positions with each key signal representing a work task for a call served by one of said positions, (2) activating a call serving program upon the reception of a first signal for a call, (3) analyzing each subsequently received signal for the same call to determine whether it represents a logical or illogical service request, and (4) disregarding any analyzed signal representing an illogical request.

27. The method of claim 26 in which said method further includes the steps of (1) temporarily storing all signals for said call that are received during a short real time break of said activated program, and (2) analyzing each stored signal during a longer real time break of said activated program.

28. The method of claim 27 in combination with the additional step of activating a call serving work task associated with an analyzed signal upon a determination that the signal represents a logical request.

29. The method of claim 28 in combination with the additional step of initiating the work task represented by any newly received signal for a call after a priorly activated program has completed its final function on the same call and given up control of the system.

30. A method of operating a stored program controlled switching system in which work tasks are effected by time segmented programs with the interval between successive segments of a program comprising relatively short real time breaks of a predetermined finite duration and longer real time breaks of an indefinite duration, said method comprising the steps of (1) receiving call signals each of which represents a system work task, (2) temporarily storing all signals received for a call during a short real time break of a priorly initiated program for the same cell, (3) analyzing said stored signals during a longer real time break of said priorly initiated program to determine whether each represents an illogical or a logical service request, (4) disregarding a signal if it represents an illogical service request, and (5) changing the state of the call if an analyzed signal represents a logical request.

31. The method of claim 30 in combination with the additional step of initiating the work task represented by a received signal for a call when all priorly activated programs for said call have completed their final work function.

32. The method of claim 31 in combination with the additional steps of (1) extending each call served by said system to any one of said of a plurality of operator positions, (2) selectively generating signals representing work tasks for calls served by said positions, and (3) transmitting each generated signal to the call signal receiving portion of said system.

33. A method of operating a program controlled switching system in which call serving work tasks are effected by time segmented programs with the interval between successive segments of a program comprising relatively short real time breaks of a predetermined finite duration and longer real time breaks of an indefinite duration, said method comprising the steps of (1) entering into a first hopper call signals each of which represents a system work task, (2) periodically unloading said signals from said first hopper, (3) transferring a signal from said first hopper to a rebuffer hopper whenever the signal is unloaded from said first hopper during a short real time break of a priorly initiated program for the call to which said signal relates, (4) analyzing each signal for a call to determine whether it represents an illogical or a logical request whenever said signal is unloaded from said first hopper during a longer real time break of a priorly initiated program for a call to which said unloaded signal pertains, periodically unloading signal from said rebuffer hopper, (6) analyzing each signal to determine whether it represents a logical or an illogical request whenever said signal is unloaded from said rebuffer hopper during a longer real time break of a priorly initiated program for a call to which said unloaded signal pertains, and (7) disregarding a signal if it is determined to a representation an illogical request.

34. The method of claim 33 in combination with the additional steps of changing the state of the call by initiating the call serving work task associated with an unloaded signal upon a determination that the signal represents a logical request.

35 The method of claim 34 in combination with the additional step of reentering into said rebuffer hopper any signal unloaded therefrom during a short real time program bread for a call to which said signal pertains.

36. The method of claim 35 in combination with the additional steps of (1) extending each cell served by said system to any one of a plurality of operator positions, (2) receiving from each position signals representing requested work tasks for calls served by said positions, and (3) transmitting each generated signal to said first hopper.

37. A method of operating program controlled switching system in which call serving work tasks are effected by time segmented programs with the interval between successive segments of a program comprising relatively short real time breaks of a predetermined finite duration and longer real time breaks of an indefinite duration, said method comprising the steps of; (1) entering into a first hopper received call signals each of which represents a system work task, (2) transferring the received signals pertaining to a call from said first hopper to a rebuffer hopper during a short real time break of a priorly initiated program of said call, (3) unloading said signals for said call from said rebuffer hopper during a longer real time break of said priorly initiated program, (4) analyzing said unloaded signals for the call to which said priorly initiated program pertains to determine whether each signal represents an illogical or a logical request, and (5) disregarding a signal if it represents an illogical service request.

38. The method of claim 37 in combination with the additional step of changing the state of the call by initiating the system work task associated with an analyzed signal upon a determination that said analyzed signal represents a logical request.

39. The method of claim 38 in combination with the additional steps of (1) reentering into said rebuffer hopper any unloaded signal therefrom during a short real time program break of the call to which said signal pertains, and (2) simultaneously preventing the application to said analyzing means of each signal that is reentered into said rebuffer hopper.

40. The method of claim 39 in combination with the additional steps of (1) subsequently unloading any newly received signals pertaining to said call from said first hopper one signal at a time subsequent to the unloading of said rebuffer hopper and during a longer real time program break for said call, (2) and analyzing each newly received signal for said call unloaded from said first hopper during a longer real time program break of said call.

41. The method of claim 40 in combination with the additional steps of (1) extending each call served by said system to any one of a plurality of operator positions, (2) generating key signals representing work tasks at said positions, and (3) entering said key signals as said call signal into said first hopper.

42. A method of operating a program controlled switching system in which call serving work tasks are effected by time segmented programs with the interval between successive segments of a program comprising relatively short real time breaks of a predetermined finite duration and longer real time breaks of an indefinite duration, said method comprising the steps of (1) selectively extending calls served by said system to any one of a plurality of operator positions, (2) selectively generating at each position different key signals each of which represents a work task to be performed for a call being served by the position at which the signal is generated, (3) generating report signals pertaining to the status of calls currently served by said system, (4) entering each generated key signal into a first hopper, (5) entering each report signal into a report hopper, (6) periodically unloading one signal at a time from said report hopper, (7) unloading one signal at a time from said first hopper subsequent to the unloading of said report hopper, and (8) activating a call serving program associated with a signal that is unloaded at times other than during short or longer real time program break of a call to which said unloaded signal pertains.

43. The method of claim 42 in combination with the additional steps of (1) analyzing each signal unloaded from said first hopper and said report hopper during a long real time break of a priorly initiated program for a call to which said unloaded signal relates to determine whether the unloaded signal represents an illogical or logical service request, and (2) disregarding a signal is it represents an illogical service request.

44. The method of claim 43 in combination with the additional steps changing the state of a call by activating a call serving program associated with an unloaded signal for the same call upon a determination by said analyzing means that said signal represents a logical request.

45. The method of claim 42 in combination with the additional steps of (1) entering into a key signal rebuffer hopper each signal unloaded from said first hopper during a short real time break of a priorly initiated program for a call to which said unloaded signal pertains, (2) entering into a report rebuffer hopper any report signal unloaded from said report hopper during a short real time break of a priorly initiated program for a call to which said unloaded report signal pertains, (3) unloading said report buffer hopper one signal at a time, (4) unloading said key signal rebuffer hopper one signal at a time subsequent to the unloading of said report rebuffer hopper (5) reentering into said rebuffer hoppers any signal unloaded therefrom during a short real time program break for the call to which said signal pertains, (6) analyzing each signal pertaining to said call and unloaded from any of said hoppers during a longer real time break of said priorly initiated program to determine whether said unloaded signal represents a illogical or a logical service request, and (7) disregarding an unloaded signal if it represents and illogical service request.

46. The method of claim 45 in combination with the additional steps of changing the state of a call by activating a call serving program associated with an unloaded signal upon a determination that said signal represents a logical request.

* * * * *